United States Patent
Teyeb et al.

(10) Patent No.: US 11,412,376 B2
(45) Date of Patent: Aug. 9, 2022

(54) INTERWORKING AND INTEGRATION OF DIFFERENT RADIO ACCESS NETWORKS

(71) Applicant: Telefonaktiebolaget LM Ericsson (publ), Stockholm (SE)

(72) Inventors: Oumer Teyeb, Solna (SE); Niklas Johansson, Sollentuna (SE); Filip Mestanov, Sollentuna (SE); Karl Norrman, Stockholm (SE); Magnus Stattin, Upplands Väsby (SE); Jari Vikberg, Järna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 999 days.

(21) Appl. No.: 15/505,893

(22) PCT Filed: May 21, 2015

(86) PCT No.: PCT/SE2015/050588
§ 371 (c)(1),
(2) Date: Feb. 22, 2017

(87) PCT Pub. No.: WO2016/036296
PCT Pub. Date: Mar. 10, 2016

(65) Prior Publication Data
US 2018/0227752 A1     Aug. 9, 2018

Related U.S. Application Data

(60) Provisional application No. 62/046,311, filed on Sep. 5, 2014.

(51) Int. Cl.
*H04W 12/04*     (2021.01)
*H04W 16/14*     (2009.01)
(Continued)

(52) U.S. Cl.
CPC ........... *H04W 12/04* (2013.01); *H04W 12/06* (2013.01); *H04W 12/50* (2021.01); *H04W 16/14* (2013.01);
(Continued)

(58) Field of Classification Search
CPC . G06F 21/6209; H04L 5/001; H04L 63/0471; H04L 63/0876; H04L 2463/061;
(Continued)

(56) References Cited

U.S. PATENT DOCUMENTS 8,325,922 B1 * 12/2012 Sun .................. H04W 12/50
380/258
8,566,593 B2 * 10/2013 Sharaga ............ H04W 12/0433
713/171
(Continued)

FOREIGN PATENT DOCUMENTS

| EP | 2675241 A1 | 12/2013 |
| RU | 2012102059 A | 7/2013 |
| WO | 2015148434 A1 | 10/2015 |

OTHER PUBLICATIONS

Author Unknown, "Technical Specification Group Radio Access Network; Evolved Universal Terrestrial Radio Access (E-UTRA); User Equipment (UE) procedures in idle mode (Release 12)," Technical Specification 36.304, Version 12.0.0, 3GPP Organizational Partners, Mar. 2014, 34 pages.
(Continued)

*Primary Examiner* — Alpus Hsu
(74) *Attorney, Agent, or Firm* — Withrow & Terranova, PLLC

(57) ABSTRACT

The proposed technology generally relates to interworking and integration of different radio access networks, and more specifically to carrier aggregation between different radio access networks such as a cellular radio access network, e.g.
(Continued)

a 3GPP network, on one hand and a WLAN network such as Wi-Fi, on the other hand. Such tight interworking/aggregation of radio access networks puts new requirements on efficient handling of authentication and security aspects. The proposed technology provides methods, and corresponding network nodes, computer programs, carriers comprising such computer programs, and computer program products as well as arrangements to support carrier aggregation between different radio access networks.

16 Claims, 22 Drawing Sheets

(51) Int. Cl.
| | |
|---|---|
| *H04W 48/08* | (2009.01) |
| *H04W 76/15* | (2018.01) |
| *H04W 92/02* | (2009.01) |
| *H04W 92/20* | (2009.01) |
| *H04W 12/06* | (2021.01) |
| *H04W 12/50* | (2021.01) |
| H04W 88/06 | (2009.01) |
| H04L 5/00 | (2006.01) |
| H04W 84/04 | (2009.01) |

(52) U.S. Cl.
CPC ........... *H04W 48/08* (2013.01); *H04W 76/15* (2018.02); *H04W 92/02* (2013.01); *H04W 92/20* (2013.01); *H04L 5/001* (2013.01); *H04W 84/047* (2013.01); *H04W 88/06* (2013.01)

(58) Field of Classification Search
CPC ....... H04L 2463/062; H04L 2463/121; H04W 12/04; H04W 12/06; H04W 84/12; H04W 88/06

See application file for complete search history.

(56) References Cited

U.S. PATENT DOCUMENTS

| | | | | |
|---|---|---|---|---|
| 8,731,519 | B2 | 5/2014 | Flynn et al. | |
| 8,971,851 | B2* | 3/2015 | Campagna | H04W 12/03 |
| | | | | 455/406 |
| 9,113,450 | B2* | 8/2015 | Pelletier | H04W 74/04 |
| 9,344,895 | B2* | 5/2016 | Wu | H04W 12/08 |
| 9,526,002 | B2* | 12/2016 | Sharma | H04W 12/04 |
| 9,654,284 | B2* | 5/2017 | Chen | H04W 12/04 |
| 9,788,358 | B2* | 10/2017 | Pelletier | H04W 74/04 |
| 9,801,099 | B2* | 10/2017 | Gage | H04W 12/04 |
| 9,942,210 | B2* | 4/2018 | Liu | H04W 12/04 |
| 9,961,542 | B2* | 5/2018 | Rajadurai | H04W 12/04 |
| 9,967,740 | B2* | 5/2018 | Rajadurai | H04W 12/04 |
| 2013/0044709 | A1 | 2/2013 | Adjakple et al. | |
| 2013/0242897 | A1 | 9/2013 | Meylan et al. | |
| 2014/0050086 | A1 | 2/2014 | Himayat et al. | |
| 2014/0092865 | A1 | 4/2014 | Heo et al. | |
| 2014/0308921 | A1* | 10/2014 | Zhang | H04W 92/20 |
| | | | | 455/410 |
| 2015/0350896 | A1* | 12/2015 | Jeong | H04W 12/04 |
| | | | | 455/410 |
| 2016/0157095 | A1* | 6/2016 | Zhang | H04W 52/0209 |
| | | | | 380/273 |

OTHER PUBLICATIONS

Author Unknown, "Technical Specification Group Radio Access Network; Evolved Universal Terrestrial Radio Access (E-UTRA); Radio Resource Control (RRC); Protocol specification (Release 12)," Technical Specification 36.331, Version 12.1.0, 3GPP Organizational Partners, Mar. 2014, 356 pages.

Huawei et al., "S3-151842: Introduce an authentication scheme for LTE-WLAN aggregation," 3rd Generation Partnership Project (3GPP), TSG SA WG3 (Security) Meeting #80, Aug. 24-28, 2015, 3 pages, Tallinn, Estonia.

Intel Corporation, "RP-140685: Motivation for new SI: Integrated LTE-WLAN RATs," 3rd Generation Partnership Project (3GPP), TSG RAN Meeting #64, Jun. 10-13, 2014, 4 pages, Sophia Antipolis, France.

Intel Corporation, "RP-141276: New SI Proposal: LTE-WLAN Radio Level Integration," 3rd Generation Partnership Project (3GPP), Work Item, TSG RAN Meeting #65, Sep. 9-12, 2014, 6 pages, Edinburgh, Scotland.

International Search Report and Written Opinion for International Patent Application No. PCT/SE2015/050588, dated Dec. 16, 2015, 17 pages.

Official Action for Russian Patent Application No. 2017111083, dated Feb. 5, 2018, 8 pages.

Extended European Search Report for European Patent Application No. 15837508.9, dated Jul. 13, 2017, 12 pages.

International Preliminary Report on Patentability for International Patent Application No. PCT/SE2015/050588, dated Mar. 16, 2017, 14 pages.

Aboba, B. et al., ""RADIUS (Remote Authentication Dial In User Service)Support For Extensible Authentication Protocol (EAP),"" Network Working Group Request for Comments: 3579, Sep. 2003, The Internet Society, 4 pages.

Author Unknown, ""IEEE Standard for Information technology—Telecommunications and information exchange between systems,Local and metropolitan area networks—Specific requirements, Part 11: Wireless LAN Medium Access Control(MAC) and Physical Layer (PHY) Specifications,"" IEEE Standard 802.11-2016, Dec. 14, 2016, The Institute of Electrical and Electronics Engineers, Inc., 3534 pages.

Haverinen, H. et al., ""Extensible Authentication Protocol Method forGlobal System for Mobile Communications (GSM)Subscriber Identity Modules (EAP-SIM),"" Network Working Group Request for Comments: 4186, Jan. 2006, The Internet Society, 92 pages.

Examination Report for European Patent Application No. 15837508.9, dated Jan. 15, 2019, 6 pages.

Examination Report for Indian Patent Application No. 201747011573, dated May 28, 2020, 6 pages.

* cited by examiner

INTERWORKING AND INTEGRATION OF DIFFERENT RADIO ACCESS NETWORKS

This application is a 35 U.S.C. § 371 national phase filing of International Application No. PCT/SE2015/050588, filed May 21, 2015, which claims the benefit of U.S. Provisional Application No. 62/046,311, filed Sep. 5, 2014, the disclosures of which are incorporated herein by reference in their entireties.

TECHNICAL FIELD

The proposed technology generally relates to interworking and integration of different radio access networks, and more specifically to methods, and corresponding network nodes, computer programs, carriers comprising such computer programs, and computer program products as well as arrangements to support carrier aggregation between different radio access networks including a first radio access network and a second radio access network.

BACKGROUND

Interworking and integration of different radio access networks, of the same or different radio access technologies, is currently an interesting area of study and research. The general area of research ranges from interworking of a cellular radio network, such as a 3GPP network, and a Wireless Local Area Network, WLAN to the interworking of a 3GPP network and non-3GPP network other than WLAN, and even interworking between different 3GPP networks.

In particular there has been a growing interest in realizing a relatively tight integration in the form of carrier aggregation between different radio access networks such as a cellular radio access network, e.g. a 3GPP network, on one hand and a WLAN network such as Wi-Fi, on the other hand.

Such tight interworking/aggregation of radio access networks puts new requirements on efficient handling of authentication and security aspects. The security aspects may be handled on different protocol levels in the interworking networks and also according to different procedures. This may result in duplication of functionalities and/or possible conflicts in the security operation.

SUMMARY

It is a general object to enable and/or support efficient interworking and/or aggregation between different radio access networks.

In particular it is desirable to provide an efficient approach to handle security in network aggregation scenarios such as 3GPP/WLAN aggregation.

These and other objects are met by at least one embodiment of the proposed technology.

According to a first aspect, there is provided a method of operation of a first network node for supporting carrier aggregation between different radio access networks, the first network node configured for operation in a first radio access network, the method comprising:
 configuring a second network node of a second radio access network with keying material; and
 configuring the second network node to establish an association with a wireless device associated with a given identifier based on said keying material; and
 configuring said second network node to forward data from the wireless device to said first network node.

According to a second aspect, there is provided a first network node configured to support carrier aggregation between different radio access networks, the first network node adapted for operation in a first radio access network,
 wherein the first network node is adapted to configure a second network node of a second radio access network with keying material; and
 wherein the first network node is adapted to configure the second network node to establish an association with a wireless device associated with a given identifier based on said keying material; and
 wherein the first network node is adapted to configure said second network node to forward data from the wireless device to said first network node.

According to a third aspect, there is provided a computer program for supporting, when executed by at least one processor, carrier aggregation between different radio access networks, the computer program comprising instructions, which when executed, cause the at least one processor to:
 provide keying material for configuration of a network node of a radio access network; and
 provide a configuration of the network node to establish an association with a wireless device associated with a given identifier based on said keying material; and
 provide a configuration of the network node to forward data from the wireless device to another network node of a different radio access network.

According to a fourth aspect, there is provided a first network node for supporting carrier aggregation between different radio access networks, the first network node adapted for operation in a first radio access network, wherein the first network node comprises:
 a first providing module for providing keying material for configuration of a second network node of a second radio access network;
 a second providing module for providing configuration of the second network node to establish an association with a wireless device associated with a given identifier based on said keying material; and
 a third providing module for providing configuration of the second network node to forward data from the wireless device to the first network node.

According to a fifth aspect, there is provided a method of operation of a second network node for supporting carrier aggregation between different radio access networks, the second network node configured for operation in a second radio access network, the method comprising:
 receiving configuration for establishing an association with a wireless device;
 announcing a network identifier;
 establishing the association with the wireless device if the wireless device connected to the second network node using the network identifier; and
 receiving data from the wireless device and forwarding the data to a first network node of a first radio access network.

According to a sixth aspect, there is provided a second network node configured to support carrier aggregation between different radio access networks, the second network node adapted for operation in a second radio access network,
 wherein the second network node is adapted to receive configuration for establishing an association with a wireless device;
 wherein the second network node is adapted to announce a network identifier;

wherein the second network node is adapted to establish the association with the wireless device if the wireless device connected to the second network node using the network identifier; and wherein the second network node is adapted to receive data from the wireless device and forward the data to a first network node of a first radio access network.

According to a seventh aspect, there is provided a computer program for supporting, when executed by at least one processor, carrier aggregation between different radio access networks, the computer program comprising instructions, which when executed, cause the at least one processor to:

receive configuration for establishing an association with a wireless device;

determine a network identifier;

establish the association with the wireless device if the wireless device connected to a network node, of a radio access network, using the network identifier; and receive data from the wireless device and forward the data to another network node of a different radio access network.

According to an eight aspect, there is provided a second network node for supporting carrier aggregation between different radio access networks, the second network node adapted for operation in a second radio access network, wherein said second network node comprises:

a receiving module for receiving configuration for establishing an association with a wireless device;

an announcing module for announcing a network identifier;

an establishing module for establishing the association with the wireless device if the wireless device connected to the second network node using the network identifier; and a data receiving and forwarding module for receiving data from the wireless device and forwarding the data to a first network node of a first radio access network.

According to a ninth aspect, there is provided a method of operation of a wireless device for supporting carrier aggregation between different radio access networks, the method comprising:

receiving information for establishing an association with a second network node of a second radio access network, said information comprising a network identifier;

establishing an association with the second network node using the network identifier; and sending data, targeted for a first network node of a first radio access network, to the second network node.

According to a tenth aspect, there is provided a wireless device configured to support carrier aggregation between different radio access networks, wherein the wireless device is adapted to receive information for establishing an association with a network node of a radio access network, said information comprising a network identifier;

wherein the wireless device is adapted to establish an association with the network node using the network identifier; and wherein the wireless device is adapted to send, to the network node, data targeted for another network node of a different radio access network.

According to an eleventh aspect, there is provided a computer program for supporting, when executed by at least one processor, carrier aggregation between different radio access networks, the computer program comprising instructions, which when executed, cause the at least one processor to:

receive information for establishing an association with a network node of a radio access network, said information comprising a network identifier; establish an association with the network node using the network identifier; and send, towards the network node, data targeted for another network node of a different radio access network.

According to a twelfth aspect, there is provided a wireless device for supporting carrier aggregation between different radio access networks, wherein the wireless device comprises:

a receiving module for receiving information for establishing an association with a network node of a radio access network, said information comprising a network identifier;

an establishing module for establishing an association with the network node using the network identifier; and a data sending module for sending, to the network node, data targeted for another network node of a different radio access network.

According to a thirteenth aspect, there is provided a carrier comprising a computer program according to any of the third, seventh and eleventh aspects.

According to a fourteenth aspect, there is provided a computer-program product comprising a computer-readable medium having stored thereon a computer program according to any of the third, seventh and eleventh aspects.

According to a fifteenth aspect, there is provided an arrangement for supporting carrier aggregation between different radio access networks. The arrangement is configured to provide keying material to an access point of a Wireless Local Area Network, WLAN, to enable establishment of a security association between the access point and a wireless device to ensure over-the-air WLAN security for carrier aggregation when forwarding traffic data of the wireless device to and from a base station of a cellular radio access network via the access point.

According to a sixteenth aspect, there is provided a base station comprising such an arrangement.

According to a seventeenth aspect, there is provided an operation and maintenance, OAM, system comprising such an arrangement.

In this way, efficient interworking and/or aggregation between different radio access networks is/are supported and/or enabled.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

For a better understanding of the proposed technology, it may be useful to begin with a brief overview of an example of wireless communication environment based on different types of networks.

Figure 1:
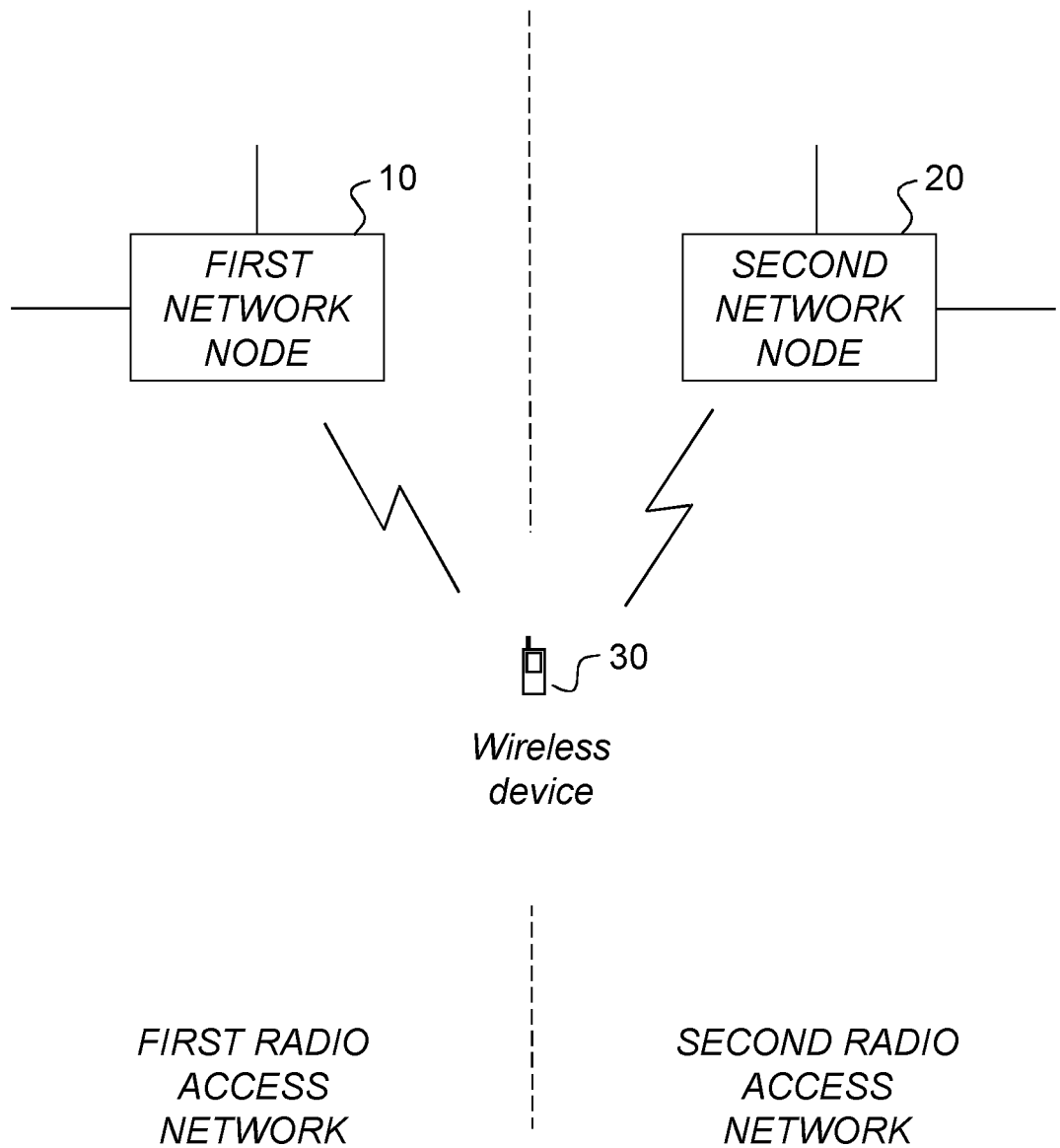
FIG. 1 is a schematic diagram illustrating an example of wireless communication environment based on at least two different radio access networks.

FIG. 1 is a schematic diagram illustrating an example of wireless communication environment based on at least two different radio access networks, including a first radio access network and a second radio access network. The first radio access network may include one or more first network nodes 10 such as one or more base stations, network controllers, access points, and/or access controllers, depending on the type of access network. The second radio access network may also include one or more second network nodes 20. A wireless device 30 may be communicating within the first radio access network and/or the second radio access network. By way of example, the wireless device, such as a mobile terminal, User Equipment, UE, and/or mobile station may initially be served by the first radio access network. Potentially, the wireless device may be off-loaded to the second radio access network. The wireless device may be in communication with both networks, although just being served by one of the networks. For example, while being served by the first access network, the wireless device may contact the second network. Depending on the situation, the wireless device may then be 'handed over' or off-loaded from the first access network to the second access network, or vice versa.

As used herein, the non-limiting terms "wireless device" and "user equipment" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like. In particular, the term "wireless device" should be interpreted as non-limiting terms comprising any type of wireless device communicating with a radio network node in a radio communication system or any device equipped with radio circuitry for wireless communication according to any relevant standard for communication within a wireless communication system.

As used herein, the non-limiting term "network node" may refer to base stations, access points, network control nodes such as network controllers, radio network controllers, base station controllers and the like. In particular, the term "base station" may encompass different types of radio base stations including standardized base station functions such as Node Bs, or evolved Node Bs, eNBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like.

As previously mentioned, there has been a growing interest in realizing a relatively tight integration in the form of carrier aggregation between different radio access networks such as a cellular radio access network, e.g. a 3GPP network, on one hand and a WLAN network such as Wi-Fi, on the other hand. For example, such tight interworking/aggregation of radio access networks puts new requirements on efficient handling of authentication and security aspects.

The steps and actions described herein do not necessarily have to be performed in a given order, unless specifically indicated. This means that the order of steps may be changed, where possible. It may even be possible to perform certain steps in parallel.

Figure 2:
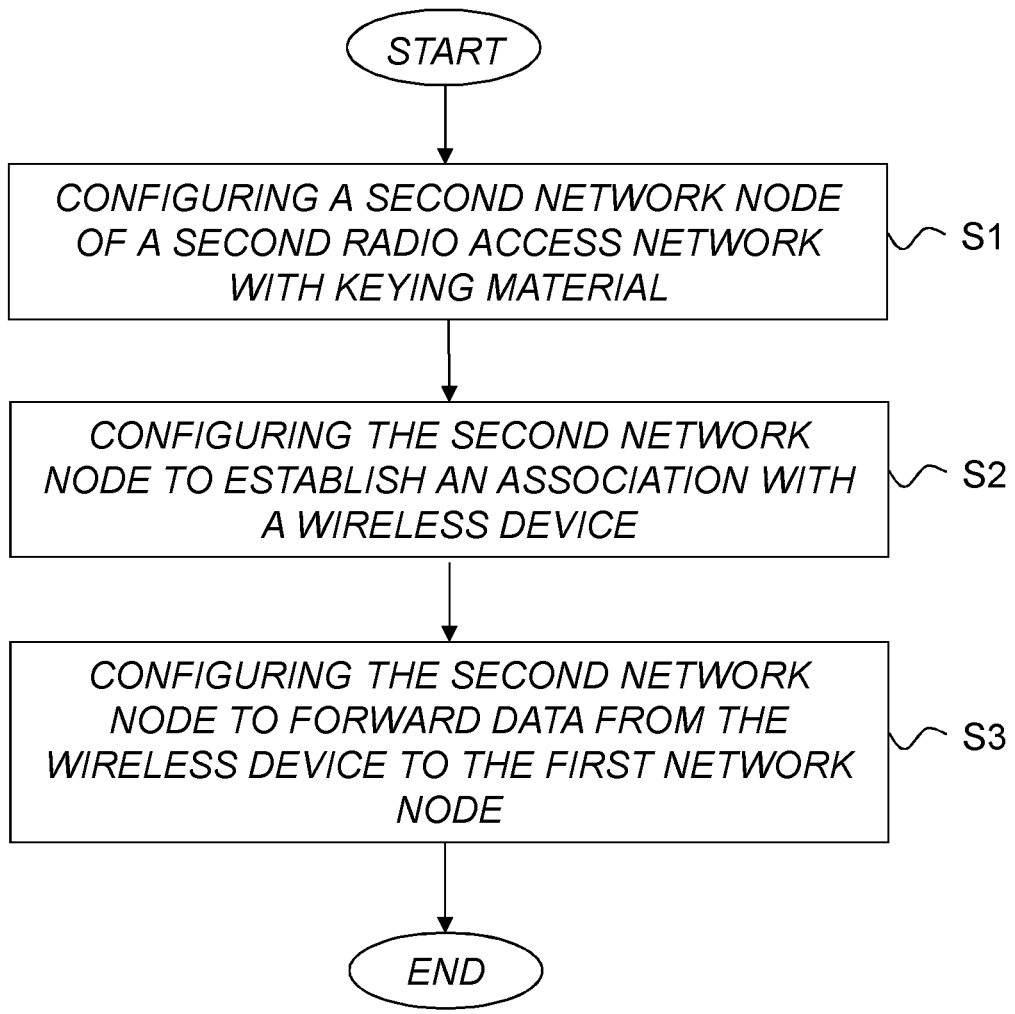
FIG. 2 is a schematic flow diagram illustrating an example of a method of operation of a first network node for supporting carrier aggregation between different radio access networks.

With reference to the schematic flow diagram of FIG. 2, there is provided a method of operation of a first network node for supporting carrier aggregation between different radio access networks. The first network node is configured for operation in a first radio access network. The method comprises the following steps:

S1: configuring a second network node of a second radio access network with keying material; and S2: configuring the second network node to establish an association with a wireless device associated with a given identifier based on said keying material; and S3: configuring said second network node to forward data from the wireless device to said first network node.

In an optional embodiment, the method further comprises configuring the wireless device with information enabling the wireless device to derive said keying material.

As an example, the information may be the keying material.

By way of example, the establishment of the association may be based on exchange of random value(s) between the second network node and the wireless device, enabling generation of a key using said random value(s) and the keying material.

Optionally, the method further comprises configuring the wireless device with a network identifier associated with the second network node, enabling the wireless device to establish the association with the configured second network node. As an example, the keying material enables encryption of over-the-air traffic.

As indicated, the different radio access networks may be based on the same or different radio access technologies, so-called RATs.

For example, the first radio access network may be a cellular radio access network and the second radio access network may be a Wireless Local Area Network, WLAN.

In a particular example, the cellular radio access network is a 3rd Generation Partnership Project, 3GPP, cellular radio access network.

By way of example, the first network node is a base station and the second network node is an access point.

The wireless device may be a User Equipment, UE, and/or wireless station, STA.

In an optional embodiment, the information comprises at least one of a nonce, a timestamp, a sequence number, a random number, a combination of an identifier associated with second network node and an identifier associated with wireless device and a timestamp.

Optionally, the association is an association between the wireless device and the second network node.

For example, the association may be a security association, such as for example a WLAN security association.

Figure 3:
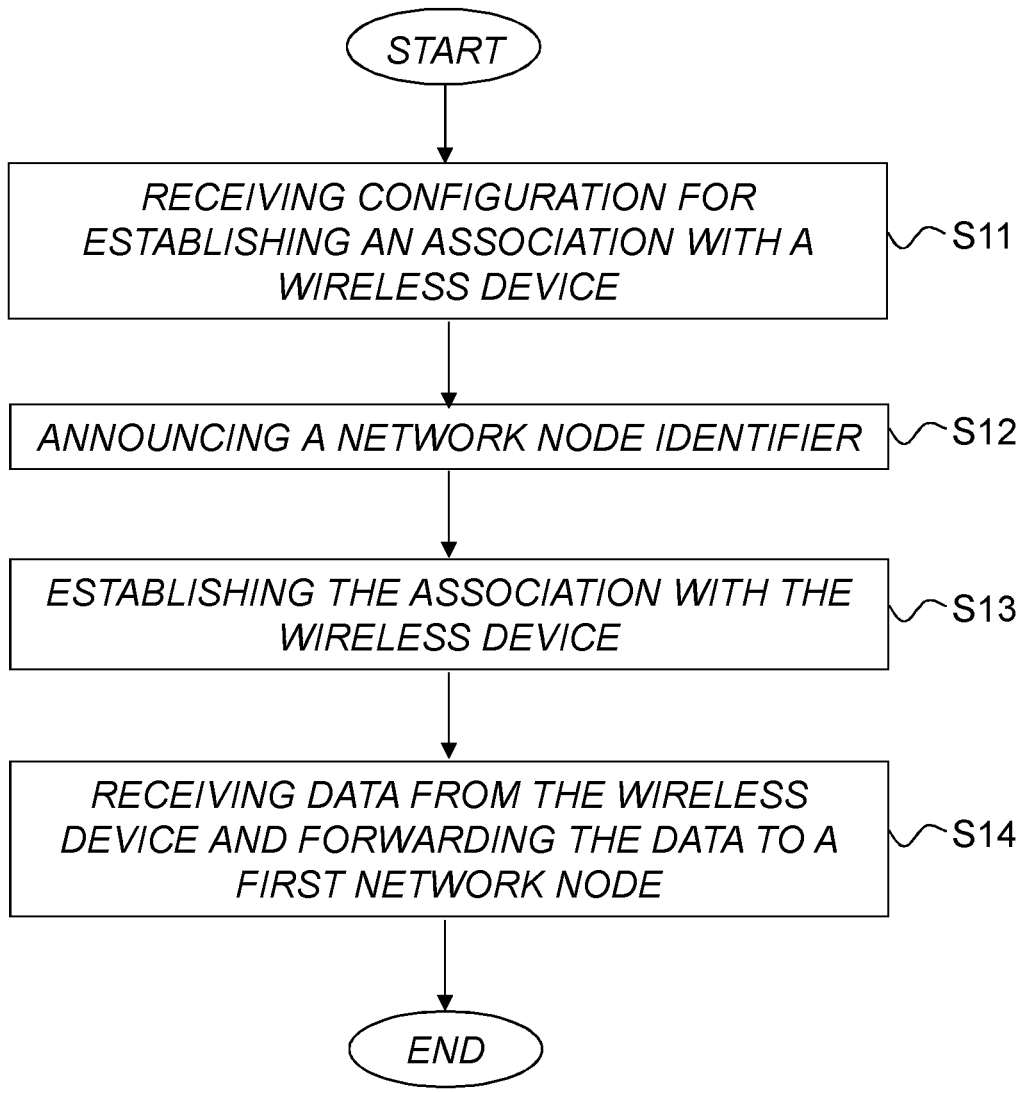
FIG. 3 is a schematic flow diagram illustrating an example of a method of operation of a second network node for supporting carrier aggregation between different radio access networks.

With reference to the schematic flow diagram of FIG. 3, there is provided a method of operation of a second network node for supporting carrier aggregation between different radio access networks. The second network node is configured for operation in a second radio access network. The method comprises the following steps:

S11: receiving configuration for establishing an association with a wireless device;

S12: announcing a network identifier;

S13: establishing the association with the wireless device if the wireless device connected to the second network node using the network identifier; and S14: receiving data from the wireless device and forwarding the data to a first network node of a first radio access network.

In an optional embodiment, the configuration comprises keying material.

By way of example, the establishment of the association may be based on exchange of random value(s) between the second network node and the wireless device, enabling generation of a key using said random value(s) and the keying material.

As an example, the keying material enables encryption of over-the-air traffic.

As indicated, the different radio access networks may be based on the same or different radio access technologies, so-called RATs.

For example, the first radio access network may be a cellular radio access network and the second radio access network may be a Wireless Local Area Network, WLAN.

In a particular example, the cellular radio access network is a 3rd Generation Partnership Project, 3GPP, cellular radio access network.

By way of example, the first network node is a base station and the second network node is an access point.

The wireless device may be a User Equipment, UE, and/or wireless station, STA.

In an optional embodiment, the information comprises at least one of a nonce, a timestamp, a sequence number, a random number, a combination of an identifier associated with second network node and an identifier associated with wireless device and a timestamp.

Optionally, the association is an association between the wireless device and the second network node.

For example, the association may be a security association, such as for example a WLAN security association.

Figure 4:
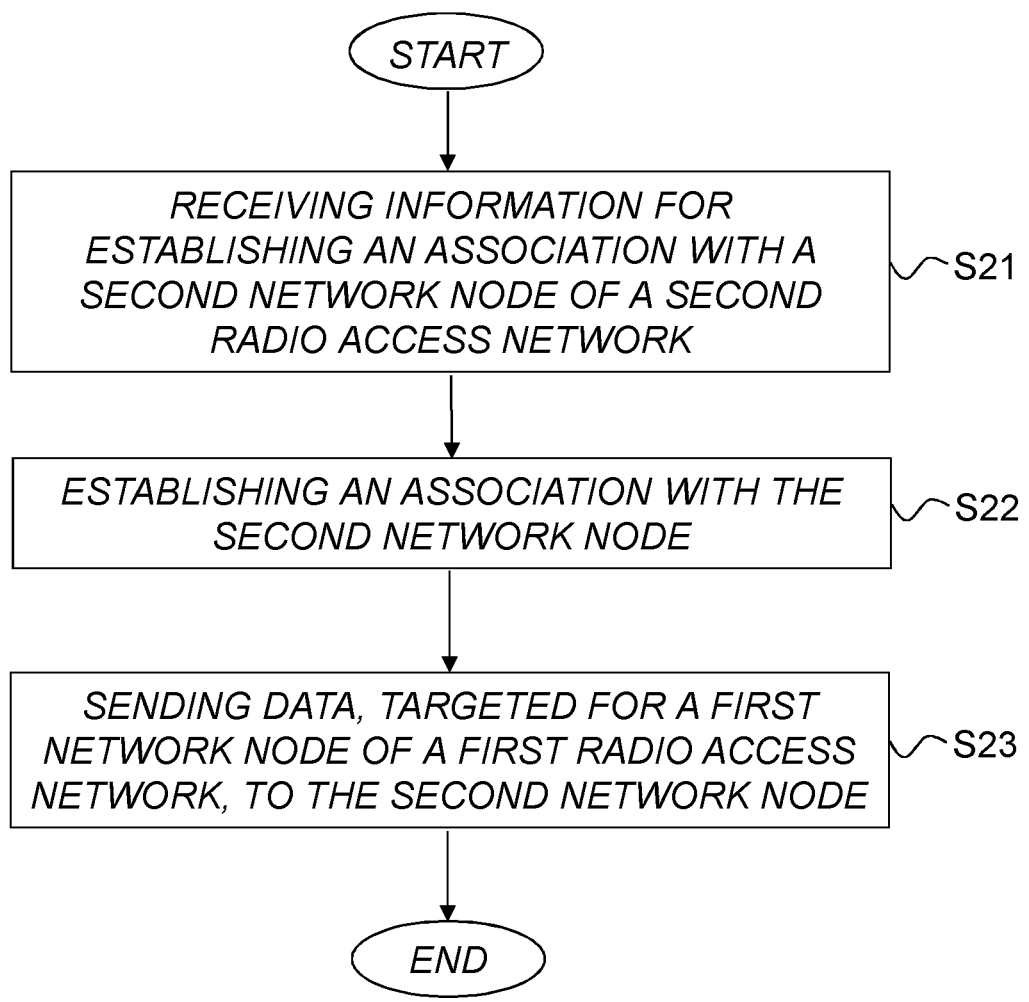
FIG. 4 is a schematic flow diagram illustrating an example of a method of operation of wireless device for supporting carrier aggregation between different radio access networks.

With reference to the schematic flow diagram of FIG. 4, there is provided a method of operation of wireless device for supporting carrier aggregation between different radio access networks. The method comprises the following steps:

S21: receiving information for establishing an association with a second network node of a second radio access network, said information comprising a network identifier;

S22: establishing an association with the second network node using the network identifier; and S23: sending data, targeted for a first network node of a first radio access network, to the second network node.

In an optional embodiment, the method further comprises deriving a key based on at least the received information and using said key to establish the association with the second network node.

As an example, the establishment of the association comprises exchanging random values between the second node and the wireless device, generating a second key using said random values and the derived key.

In an optional embodiment, the information comprises keying material.

By way of example, the establishment of the association may be based on exchange of random value(s) between the second network node and the wireless device, enabling generation of a key using said random value(s) and the derived key.

As an example, the key(s) enables encryption of over-the-air traffic.

As indicated, the different radio access networks may be based on the same or different radio access technologies, so-called RATs.

For example, the first radio access network may be a cellular radio access network and the second radio access network may be a Wireless Local Area Network, WLAN.

In a particular example, the cellular radio access network is a 3rd Generation Partnership Project, 3GPP, cellular radio access network.

By way of example, the first network node is a base station and the second network node is an access point.

The wireless device may be a User Equipment, UE, and/or wireless station, STA.

In an optional embodiment, the information comprises at least one of a nonce, a timestamp, a sequence number, a random number, a combination of an identifier associated with second network node and an identifier associated with wireless device and a timestamp.

Optionally, the association is an association between the wireless device and the second network node.

For example, the association may be a security association, such as for example a WLAN security association.

For example, the network identifier may be a network node identifier.

As described herein, the keying material may include one or more security keys and/or information for deriving one or more security keys such as the PMK, PTK, GTK and $K_{eNB}$ and/or other key(s) mentioned below.

As mentioned, the association may be a security association, and the establishment of such an association may for example be intended for ensuring that the wireless device and/or the relevant network node has information and/or learn about the security key(s) required for the security association. By way of example, this may involve signaling for distributing keying material and/or other messages such as association request and/or response messages.

As described herein, the data forwarded from the wireless device to the first network node may for example be traffic data such as aggregated UE data targeted for the first network node such as a base station. This traffic data may be secured/encrypted based on the established security association, e.g. using the key(s) mentioned herein. In other words, aggregated UE data targeted for the first network node may be encrypted based on the established security association.

In the following, the proposed technology will be described with reference to non-limiting examples related to particular scenarios for 3GPP/WLAN interworking. The proposed technology is not limited thereto, and it should be understood that the concepts set forth below are generally applicable for supporting security in carrier aggregation between different radio access networks.

It may be useful to begin with an overview and in-depth analysis of the current state-of-the art with respect to 3GPP/WLAN interworking. Although reference will mainly be made to a "UE" from a 3GPP perspective and a "STA" from a WLAN perspective, it should be understood that the terms "UE", "STA", and "wireless device" can be used interchangeably.

3GPP/WLAN Interworking

Most current Wi-Fi/WLAN deployments are totally separate from mobile networks, and can be seen as non-integrated from the terminal perspective. Wi-Fi and WLAN are used interchangeably herein. Most operating systems (OSs) for UEs such as Android™ and ioS®, support a simple Wi-Fi offloading mechanism where a UE immediately switches all its IP traffic to a Wi-Fi network upon a detection of a suitable network with a received signal strength above a certain level. Henceforth, the decision to offload to a Wi-Fi or not is referred to as access selection strategy and the term "Wi-Fi-if-coverage" is used to refer to the aforementioned strategy of selecting Wi-Fi whenever such a network is detected.

There are several drawbacks of the "Wi-Fi-if-coverage" strategy.

Though the user/UE can save previous pass codes for already accessed Wi-Fi Access Points (APs), hotspot login for previously non-accessed APs usually requires user intervention, either by entering the pass code in Wi-Fi Connection Manager (CM) or using a web interface. The connection manager, for example implemented as software executed on a UE, is normally in charge of managing the network connections of the terminal, taking into account user preferences, operator preferences, network conditions, and so forth.

No consideration of expected user experience is made except those considered in the UE implemented proprietary solution, and this can lead to a UE being handed over from a high data rate mobile network connection to a low data rate Wi-Fi connection. Even though the UE's OS or some high level software is smart enough to make the offload decisions only when the signal level on the Wi-Fi is considerably better than the mobile network link, there can still be limitations on the backhaul of the Wi-Fi Access Point (AP) that may end up being the bottleneck.

No consideration of the load conditions in the mobile network and Wi-Fi are made. As such, the UE might still be offloaded to a Wi-Fi AP that is serving several UEs while the mobile network (e.g. LTE) that it was previously connected to is rather unloaded.

Interruptions of on-going services can occur due to the change of IP address when the UE switches to the Wi-Fi network. For example, a user who started a Voice over IP (VoIP) call while connected to a mobile network is likely to experience a call drop when arriving home and the UE switching to the Wi-Fi network automatically. Though some applications are smart enough to handle this and survive the IP address change (e.g. Spotify®), the majority of current applications do not. This places a lot of burden on application developers if they have to ensure service continuity.

No consideration of the UE's mobility is made. Due to this, a fast moving UE can end up being offloaded to a Wi-Fi AP for a short duration, just to be handed over back to the mobile network. This is specially a problem in scenarios like cafes with open Wi-Fi, where a user walking by or even driving by the cafe might be affected by this. Such ping pong between the Wi-Fi and mobile network can cause service interruptions as well as generate considerable unnecessary signaling (e.g. towards authentication servers).

Recently, Wi-Fi has been subject to increased interest from cellular network operators, not only as an extension to fixed broadband access. The interest is mainly about using the Wi-Fi technology as an extension, or alternative to cellular radio access network technologies to handle the always increasing wireless bandwidth demands. Cellular operators that are currently serving mobile users with, e.g., any of the 3GPP technologies, LTE, UMTS/WCDMA, or GSM, see Wi-Fi as a wireless technology that can provide good support in their regular cellular networks. The term "operator-controlled Wi-Fi" points to a Wi-Fi deployment that on some level is integrated with a cellular network operators existing network and where the 3GPP radio access networks and the Wi-Fi wireless access may even be connected to the same core network and provide the same services.

There is currently some activity in the area of operator-controlled Wi-Fi in several standardization organizations. In 3GPP, activities to connect Wi-Fi access points to the 3GPP-specified core network is pursued, and in Wi-Fi alliance, WFA, activities related to certification of Wi-Fi products are undertaken, which to some extent also is driven from the need to make Wi-Fi a viable wireless technology for cellular operators to support high bandwidth offerings in their networks. The term Wi-Fi offload is commonly used and points towards that cellular network operators seek means to offload traffic from their cellular networks to Wi-Fi, e.g., in peak-traffic-hours and in situations when the cellular network for one reason or another needs to be off-loaded, e.g., to provide requested quality of service, maximize bandwidth or simply for coverage.

RAN Level Integration

3GPP is currently working on specifying a feature/mechanism for WLAN/3GPP Radio interworking which improves operator control w.r.t. how a UE performs access selection and traffic steering between 3GPP and WLANs belonging to the operator or its partners (it may even be so that the mechanism can be used for other, non-operator, WLANs as well, even though this is not the main target).

It is discussed that for this mechanism the RAN provides assistance parameters that helps the UE in the access selection. The RAN assistance information is composed of three main components, namely threshold values, offloading preference indicator (OPI) and WLAN identifiers. The UE is also provided with RAN rules/policies that make use of these assistance parameters.

The thresholds values could be for example for metrics such as 3GPP signal related metrics RSRP/RSRQ/RSCP/EcNo, WLAN signal related metrics such as RCPI/RSSI, WLAN load/utilization, WLAN backhaul load/capacity, etc. One example of a RAN rule that uses the threshold value could be that the UE should connect to a WLAN if the RSRP is below the signaled RSRP threshold at the same time as the WLAN RCPI is above the signaled RCPI threshold (it is also discussed that the RAN should provide thresholds for when the UE should steer traffic back from WLAN to 3GPP). The RAN rules/policies are expected to be specified in a 3GPP specification such as TS 36.304 v12.0.0 and/or TS 36.331 v12.1.0.

With the above mechanism it is likely not wanted, or maybe not even feasible, that the terminal considers any WLAN when deciding where to steer traffic. For example, it may not be feasible that the terminal uses this mechanism to decide to steer traffic to a WLAN not belonging to the operator. Hence it has been proposed that the RAN should also indicate to the terminal which WLANs the mechanism should be applied for by sending WLAN identifiers.

The RAN may also provide additional parameters which are used in ANDSF policies. One proposed parameter is offloading preference indicator (OPI). One possibility for OPI is that it is compared to a threshold in the ANDSF policy to trigger different actions, another possibility is that OPI is used as a pointer to point and, and select, different parts of the ANDSF policy which would then be used by the terminal.

The RAN assistance parameters (i.e. thresholds, WLAN identifiers, OPI) provided by RAN may be provided with dedicated signaling and/or broadcast signaling. Dedicated parameters can only be sent to the terminal when having a valid RRC connection to the 3GPP RAN. A terminal which has received dedicated parameters applies dedicated parameters; otherwise the terminal applies the broadcast parameters. If no RRC connection is established between the terminal and the RAN, the terminal cannot receive dedicated parameters.

In 3GPP, it has been agreed that ANDSF should be enhanced for release-12 to use the thresholds and OPI parameters that are communicated by the RAN to the UE, and that if enhanced ANDSF policies are provided to the UE, the UE will use the ANDSF policies instead of the RAN rules/policies (i.e. ANDSF has precedence).

Tight Integration between 3GPP and WLAN

Figure 5C:
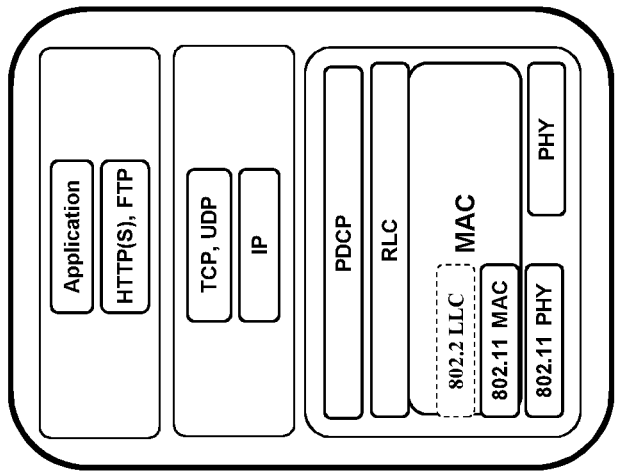
FIGS. 5A-5C are schematic diagrams illustrating three different protocol options of aggregation at the PDCP, RLC and MAC levels, respectively.
Figure 5B:
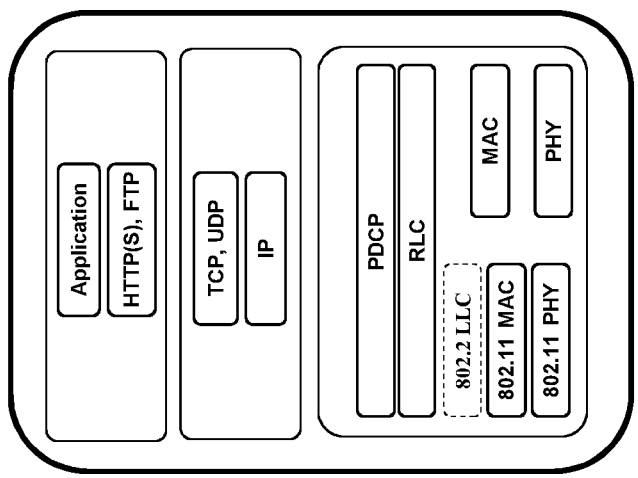
Figure 5A:
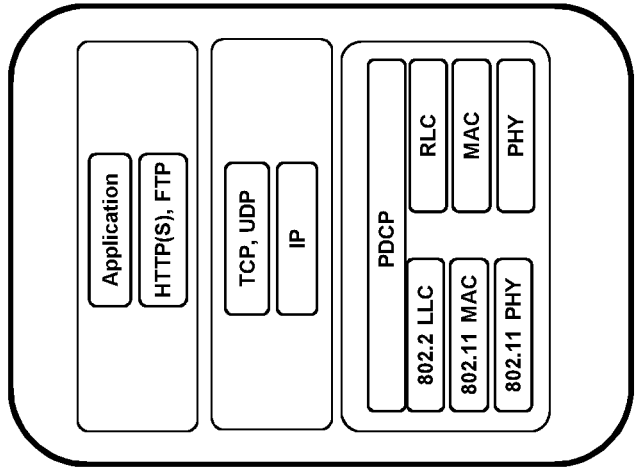

Within the scope of 3GPP rel-13, there has been a growing interest in on realizing even tighter integration/aggregation between 3GPP and WLAN (for example, the same way as carrier aggregation between multiple carriers in 3GPP, where the WLAN is used just as another carrier). Such an aggregation is expected to make it possible for a more optimal aggregation opportunity as compared to MPTCP, as the aggregation is performed at a lower layer and as such the scheduling and flow control of the data on the WLAN and 3GPP links can be controlled by considering dynamic radio network conditions. FIGS. 5A-5C illustrate three different protocol options of aggregation at the PDCP, RLC and MAC levels, respectively. This shows the main principles for these three aggregation levels and additional functionality may be needed, for example in the PDCP-level aggregation, an additional protocol layer may be used between the PDCP layer and the 802.2 LLC layer to convey information about the UE and the radio bearer the traffic is associated with.

Note that FIGS. 5A-5C show the protocol stack at a UE or an integrated/co-located eNB-WLAN AP station. In the case of a standalone AP and eNB (i.e. AP and eNB are not co-located), the protocol stack for supporting aggregation is a little bit different, as the LLC frames have now to be relayed towards the standalone eNB.

Figure 6:
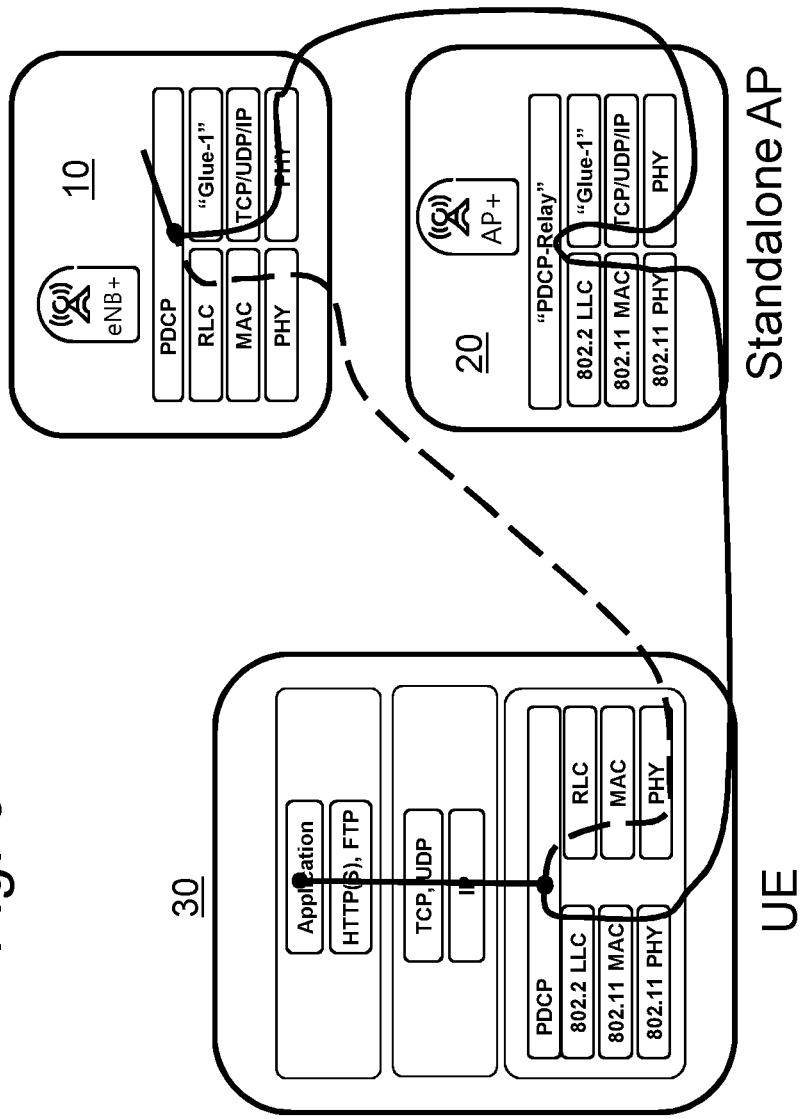
FIG. 6 is a schematic diagram illustrating an example for the case of PDCP level aggregation.

FIG. 6 is a schematic diagram illustrating an example for the case of PDCP level aggregation. In this case, once the LLC packet is decoded at the AP 20 (in the uplink direction from the UE 30 to the AP), and the AP 20 realizes that this packet is a PDCP packet that has to be routed to an eNB 10, the forwarding can be performed via normal TCP/IP protocol stack.

UE Attachment/Authentication in WLAN (with EAP-SIM)

Figure 7:
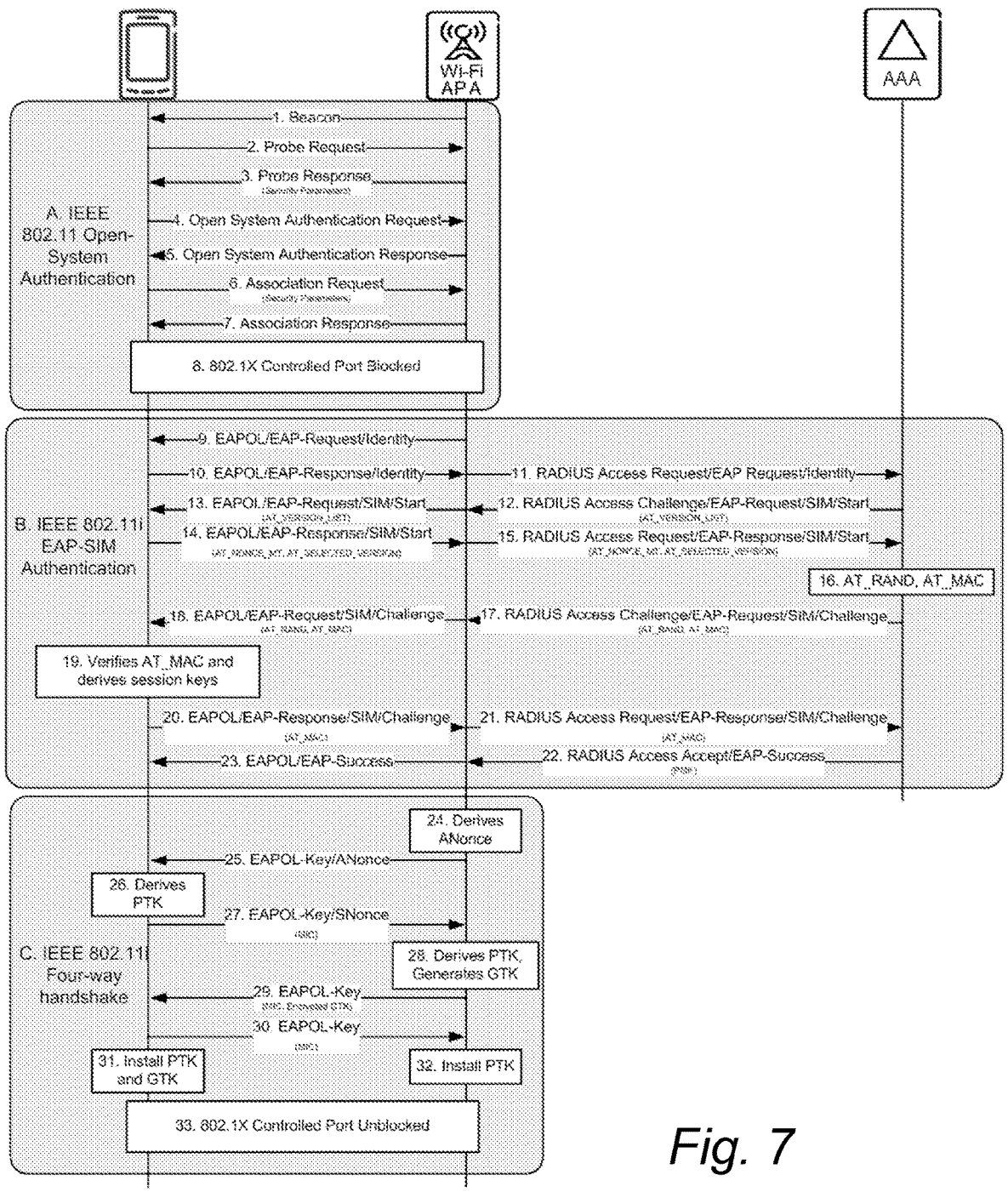
FIG. 7 is a schematic diagram illustrating an example of an authentication procedure for a wireless device.

An example of the authentication procedure for a STA is depicted in FIG. 7 and it comprises the following steps:

1 The STA receives a Beacon frame revealing (among other parameters) the security features associated with the ESS the AP belongs to. The format of the beacon frame as well as all the information elements it carries are described in Chapter 8.3.3.2 of IEEE 802.11;

2 If the STA does not receive a Beacon frame for some reason, it can generate a Probe Request and send it to the AP. This procedure is called active scanning and by performing it, the STA can receive from the AP the same information as it would have from a Beacon message. The Probe Request frame is described in Chapter 8.3.3.9 of IEEE 802.11 ([1]);

3 The AP answers with Probe Response—IEEE 802.11 ([1]), Chapter 8.3.3.10;
   a. NOTE: The discovery procedure consists of either step 1 or steps 2 and 3 (i.e., receiving a Beacon frame and exchanging probe messages are mutually exclusive);

4 The STA sends an Open System Authentication Request as defined in Chapter 11.2.3.2 of IEEE 802.11 ([1]);

5 The AP responds with an Open System Authentication Response;

6 The STA then sends an Association Request, indicating the security parameters to be used later;

7 The AP responds with an Association Response
   a. NOTE: The Open System Authentication does not provide any security. The connection between the STA and the AP is secured at a later point, by means of Authentication and Key Agreement procedure. Nevertheless, a possible attack altering the security parameters in the Open System Authentication message exchange will be detected at the stage of key derivation;
8 At this point the Open System Authentication is completed and the STA can communicate only with the AP—the rest of the traffic is blocked by the port-based network control (PBNC) enforcer, as defined in IEEE 802.1X. Some of the traffic towards external hosts, however, can be forwarded by the AP, as in the case of the communication with the RADIUS server;
9 This step is the first step of the EAP-SIM authentication RFC 4186 ([2]). The AP encapsulates an EAP-Request of Type 18 (SIM) inside an EAPOL frame, asking the STA to report its identity;
10 The STA responds with its identity. An example of such is: 1234580123000100@wlan.mnc048.mcc264.3gppnetwork.org (and IMSI is in this example 234580123000100 and the preceding "1" indicates the preference to use EAP-SIM). In the case when the STA is equipped with a SIM, the identity is the IMSI, followed by the "@" sign and the home realm. It is also possible for the STA to include an additional "1" in front of the IMSI in order to indicate preference for the exclusive use of EAP-SIM if other EAP methods are available (e.g., EAP-AKAe);
11 The AP extracts the EAP-Response message, encapsulates it in a RADIUS frame and forwards it to the backend AAA server. The handling of EAP frames over RADIUS is described by the IETF in RFC 3579 ([3]);
12 The AAA server recognizes the EAP method and sends an EAR-Request/SIM/Start, indicating that an EAP-SIM procedure has been initiated for that Supplicant. It also includes the list of supported SIM versions in the message as described in Chapter 10.2 of RFC 4186;
13 The AP relays the EAP-Request/SIM/Start message to the STA;
14 The STA responds with EAP-Response/SIM/Start message, which carries a random number (NONCE_MT) carried in the AT_NONCE_MT attribute (a randomly selected number), as well as the selected EAP-SIM version (AT_SELECTED_VERSION);
15 The AP forwards the EAP-Response/SIM/Start to the AAA server;
16 The AAA server obtains the GSM triplet (RAND, SRES and Kc) from the HLR/AuC and derives the keying material as specified in Chapter 7 of RFC 4186. The GSM triplet consists of:
  a. RAND—a 128-bit random number, generated by the Authentication Center (an entity within the GSM core network, used to authenticate subscribers at the point of initial attach) when a subscriber authentication is requested. Its main use is for the derivation of the Signed Response (SRES) and the Kc;
  b. SRES—a 32-bit variable, the expected response from the mobile station/STA after it has been challenged with the RAND;
  c. Kc—a 64-bit ciphering key, used to encipher and decipher data transmitted between the STA and the AP;
17 The AAA generates an EAP-Request/SIM/Challenge message, including RAND challenges and message authentication code attribute (AT_MAC). The AT_MAC derivation is based on the RAND and Kc values;
18 The AP forwards the EAP-Request/SIM/Challenge message to the STA;
19 The STA feeds the received RAND into the GSM algorithms running on the SIM and the output is a copy of the AT_MAC and a SRES value. The first thing for the STA to do is to check whether the AT_MAC value received by the AAA (relayed by the AP) and the one generated by the SIM match. If so the STA continues with the authentication, otherwise it responds with an EAP-Response/SIM/Client-Error message. The second thing is to derive a new AT_MAC, based on the generated SRES;
20 The new AT_MAC is sent to the AAA server (via the AP) in an EAP-Response/SIM/Challenge message;
21 The AP forwards the EAP-Response/SIM/Challenge to the AAA server;
22 The AAA server verifies the new AT_MAC value that the STA has just sent. If the verification is successful, it sends an EAP-Success message to the AP. The message also carries keying material—Pairwise Master Key (PMK). The PMK is intended for the AP only and it is not forwarded to the STA (the STA can derive the same key autonomously since it is based on the Kc, which the SIM in the STA can compute based on the RAND);
23 The AP forwards the EAP-Success message to the STA and stores the PMK for the following Four-way handshake;
24 The AP uses the PMK to generate an Authenticator nonce (ANonce);
25 The ANonce value is sent to the STA in an EAPOL-Key message;
26 Using the received ANonce (together with the SNonce and the PMK), the STA constructs the Pairwise Temporal Key (PTK);
27 The STA sends an EAPOL-Key message to the AP, including a Supplicant nonce (SNonce) and a message integrity code (MIC);
28 The AP uses the ANonce, SNonce and the PMK to construct the PTK. The AP also uses the MIC in order to verify that the STA has computed the correct and fresh key. Furthermore, the AP also generates and installs a Group Temporal Key (GTK, which is used exclusively for the encryption and decryption of broadcast and multicast traffic;
29 The AP sends to the STA an encrypted GTK, a sequence number to use for the next broadcast message and an instruction to install the PTK (the message is integrity protected by another MIC);
30 The STA responds with an acknowledgement message;
31 The STA installs both the PTK and the GTK and as of this point uses them to encrypt and decrypt all communication;
32 The AP also installs the PTK;
33 The 802.1X Controlled Port is now open and the STA can communicate with other network hosts besides the AP.

As mentioned the term STA, station, and UE are used interchangeably in the general meaning of a wireless device.

UE attachment/authentication in WLAN (with WPA2-PSK key establishment) Small enterprises, and sometimes even big enterprises, use one authentication key common to all its employees. In this case, the security for the WLAN is typically handled by WPA2-PSK (sometimes also known as WPA2 Personal).

Figure 8:
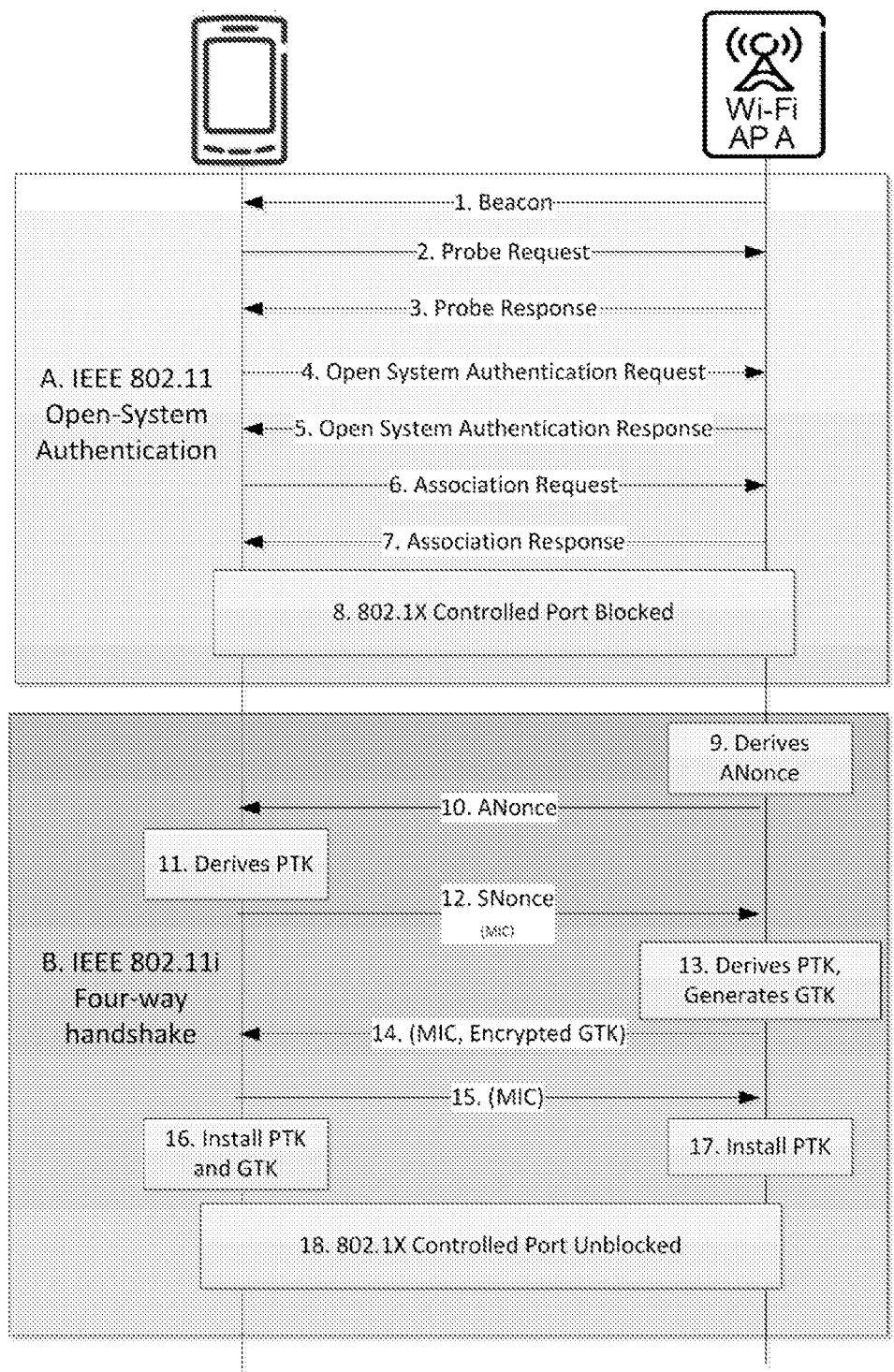
FIG. 8 is a schematic diagram illustrating another example of an authentication procedure for a wireless device.

An example of the authentication procedure for a STA is depicted in FIG. 8, and it comprises the following steps:
1 The STA receives a Beacon frame revealing (among other parameters) the security features associated with the ESS the AP belongs to. The format of the beacon frame as well as all the information elements it carries are described in Chapter 8.3.3.2 of IEEE 802.11;

2 If the STA does not receive a Beacon frame for some reason, it can generate a Probe Request and send it to the AP. This procedure is called active scanning and by performing it, the STA can receive from the AP the same information as it would have from a Beacon message. The Probe Request frame is described in Chapter 8.3.3.9 of IEEE 802.11 ([1]);

3 The AP answers with Probe Response—IEEE 802.11 ([1]), Chapter 8.3.3.10;
   a. NOTE: The discovery procedure consists of either step 1 or steps 2 and 3 (i.e., receiving a Beacon frame and exchanging probe messages are mutually exclusive);

4 The STA sends an Open System Authentication Request as defined in Chapter 11.2.3.2 of IEEE 802.11 ([1]);

5 The AP responds with an Open System Authentication Response;

6 The STA then sends an Association Request, indicating the security parameters to be used later;

7 The AP responds with an Association Response
   a. NOTE: The Open System Authentication does not provide any security. The connection between the STA and the AP is secured at a later point, by means of Authentication and Key Agreement procedure. Nevertheless, a possible attack altering the security parameters in the Open System Authentication message exchange will be detected at the stage of key derivation;

8 At this point the Open System Authentication is completed and the STA can communicate only with the AP—the rest of the traffic is blocked by the port-based network control (PBNC) enforcer, as defined in IEEE 802.1X.

9 The AP and device already share the Pairwise Master Key (PMK) in the case of WPA2-PSK. The PMK is a 256-bit pre-shared key, or generated from a pass phrase in the WPA2-PSK case. It is not specified how they come to share the PMK, but it could be, e.g., manual configuration. The AP uses the PMK to generate an Authenticator nonce (ANonce);

10 The ANonce value is sent to the STA;

11 Using the received ANonce (together with a Supplicant nonce (SNonce) and the PMK), the STA constructs the Pairwise Temporal Key (PTK);

12 The STA sends the SNonce and a message integrity code (MIC) over the message to the AP;

13 The AP uses the ANonce, SNonce and the PMK to construct the PTK. The AP also uses the MIC in order to verify that the STA has computed the correct and fresh key. Furthermore, the AP also generates and installs a Group Temporal Key (GTK, which is used exclusively for the encryption and decryption of broadcast and multicast traffic;

14 The AP sends an encrypted GTK to the STA, a sequence number to use for the next broadcast message and an instruction to install the PTK (the message is integrity protected by another MIC);

15 The STA responds with an acknowledgement message;

16 The STA installs both the PTK and the GTK and as of this point uses them to encrypt and decrypt all communication;

17 The AP also installs the PTK;

18 The 802.1X Controlled Port is now open and the STA can communicate with other network hosts besides the AP.

UE Attachment/Authentication in LTE

The terminal is often referred to as a UE (User Equipment) in 3GPP terminology. Since this section describes 3GPP access networks and how they interact with other network types from a 3GPP perspective, we use 3GPP terminology. However, it should be clear that in the context of this invention the UE and the STA are one and the same device.

Figure 9:
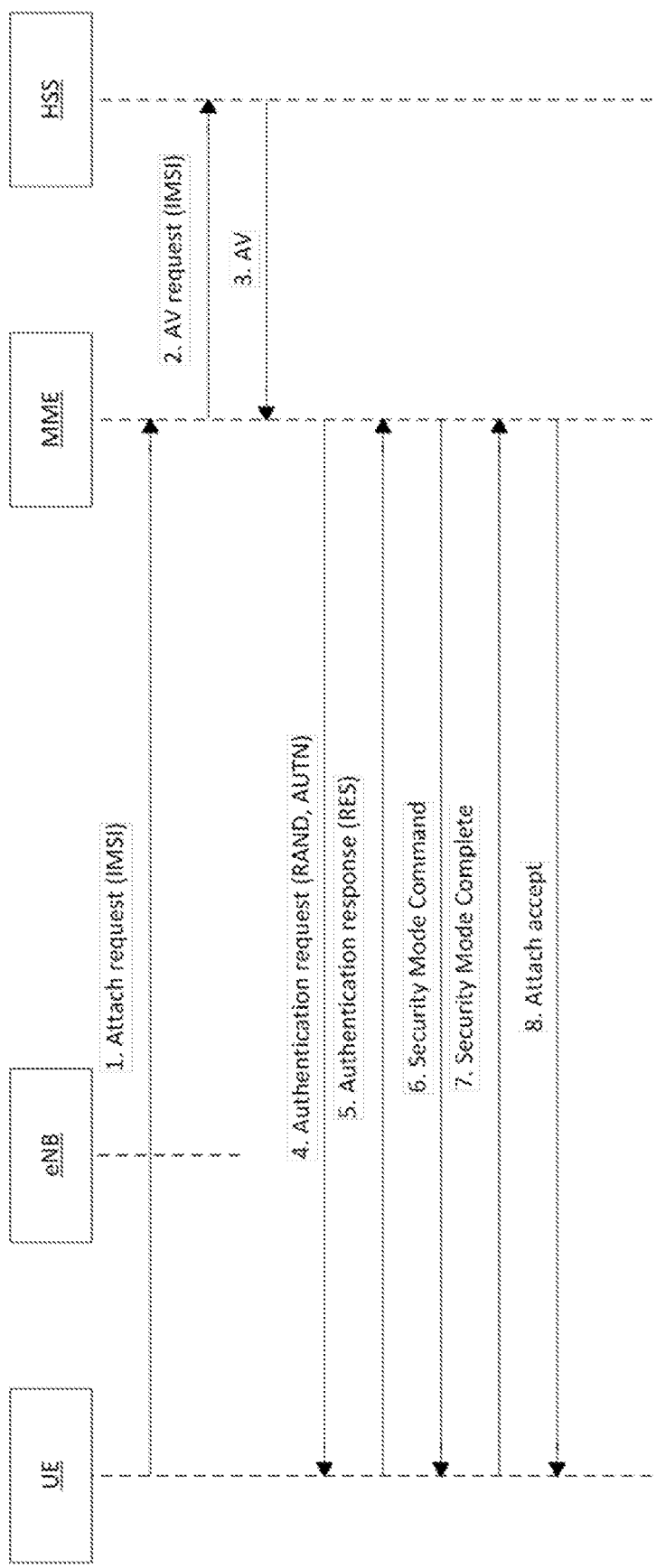
FIG. 9 is a schematic diagram illustrating an example of AKA authentication in LTE.

When a UE is connecting to a 3GPP access network it is authenticated using the Authentication and Key Agreement (AKA) protocol. This protocol is integrated in the Non Access Stratum (NAS) signaling that goes between the UE and the Mobility Management Entity (MME) in LTE and between the UE and the SGSN in packet switched GERAN or UTRAN. The AKA protocol results in that the UE and the MME are mutually authenticated and share a fresh session key called $K_{ASME}$. An example of the authentication is outlined in FIG. 9 for a typical attach to LTE. The signalling flow is very similar in UTRAN/GERAN. The eNB is the radio base station in LTE. It only functions as a relay for the NAS signalling in LTE, but is included in the figure for completeness.

1 The UE initiates the procedure by sending an attach request to the MME. The message contains the identity of the UE, the IMSI (or a temporary identity that the MME can map to the IMSI);

2 The MME requests an authentication vector (AV) for the UE from the HSS;

3 The HSS replies with an AV. The AV contains a random challenge RAND, the expected result to the challenge called XRES, an authentication token AUTN, and a session key call $K_{ASME}$;

4 The MME sends the RAND and AUTN to the UE;

5 The UE computes a response to the RAND using the USIM. The result is called RES. The UE also verifies the network authenticity and RAND freshness by verifying the AUTN, again using the USIM. If the verification passes, the UE sends the response RES back to the MME;

6 The MME verifies that the RES received in message 5 matches the XRES received in message 3. If they match the UE is considered authenticated and the MME starts NAS security based on the $K_{ASME}$ by running the security mode procedure;

7 The UE calculates the $K_{ASME}$ from the RAND using the USIM and starts NAS security based on that $K_{ASME}$;

8 The MME sends an attach accept to the UE to complete the attach procedure.

When a UE establishes a connection to the EPS core network via a non-3GPP access, it performs an EAP-AKA or EAP-AKA' authentication similarly to described in previous sections. There is no concept of handover between the two types of access, but established and torn down independently. Note that access to the EPS core network is only allowed if the UE is equipped with a USIM so that the UE can run EAP-AKA'. If the 3GPP core network is a pre-Rel-8 core network, then EAP-SIM is also allowed as described in previous sections. There is no difference between EAP-SIM and EAP-AKA(') that is significant to this invention though. The key point is that there is a session key established as a result of the authentication.

Security Key Management in LTE

Two functions are provided for the maintenance of security: ciphering of both control plane (RRC) data (i.e. SRBs 1 and 2) and user plane data (i.e. all DRBs), and integrity protection which is used for control plane (RRC) data only. Ciphering is used in order to protect the data streams from being received by a third party, while integrity protection allows the receiver to detect packet insertion or replacement.

Figure 10:
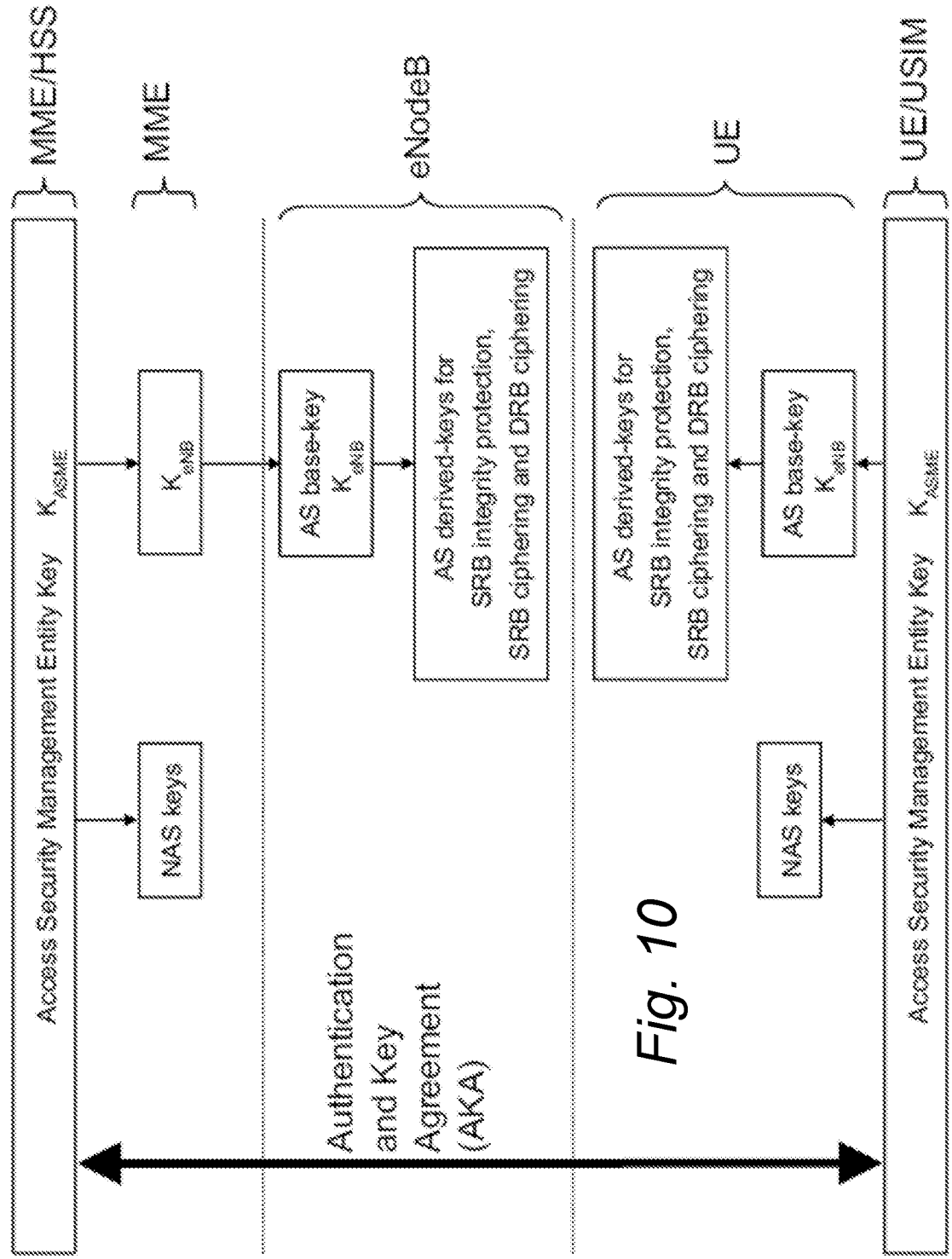
FIG. 10 is a schematic diagram illustrating an example of LTE security key derivation.

RRC always activates both functions together, either following connection establishment or as part of the handover to LTE. An example of the hierarchy of keys by which the AS security keys are generated is illustrated in FIG. 10. The process is based on a common secret key $K_{ASME}$ which is available only in the Authentication Centre in the Home Subscriber Server (HSS) and in a secure part of the Universal Subscriber Identity Module (USIM) in the UE.

A set of keys and checksums are generated at the Authentication Centre using this secret key and a random number. The generated keys, checksums and random number are transferred to the Mobility Management Entity (MME), which passes one of the generated checksums and the random number to the UE. The USIM in the UE then computes the same set of keys using the random number and the secret key. Mutual authentication is performed by verifying the computed checksums in the UE and network using NAS protocols.

Upon connection establishment, the MME and UE establish a fresh key called $K_{ASME}$. The $K_{ASME}$ is rooted in the key K mentioned above. The MME and UE further derive an AS base-key $K_{eNB}$, from $K_{ASME}$. Since the $K_{ASME}$, from which the $K_{eNB}$ is derived, is fresh, the $K_{eNB}$ is also fresh and hence statistically unique to the eNB. The MME securely transfers the $K_{eNB}$ to the eNodeB. $K_{eNB}$ is used to generate three further security keys known as the AS derived-keys: one for integrity protection of the RRC signalling (SRBs), one for ciphering of the RRC signalling and one for ciphering of user data (DRBs).

Security During Handovers in LTE

In LTE, the concept of forward security was introduced to ensure adequate security and minimize the risk of unauthorized access. Forward security means that without the knowledge of $K_{ASME}$ (the key generated during the initial UE authentication), even with the knowledge of $K_{eNB}$ (key shared between the UE and the current eNB), it will be computationally difficult to generate $K_{eNB}$s to be used between the UE and eNBs that the UE will connect to in the future.

Whenever an initial AS security context needs to be established between UE and eNB, MME and the UE shall derive a $K_{eNB}$ and a Next Hop parameter (NH). The $K_{eNB}$ and the NH are derived from the $K_{ASME}$. A NH Chaining Counter (NCC) is associated with each $K_{eNB}$ and NH parameter. Every $K_{eNB}$ is associated with the NCC corresponding to the NH value from which it was derived. At initial setup, the $K_{eNB}$ is derived directly from $K_{ASME}$, and is then considered to be associated with a virtual NH parameter with NCC value equal to zero. At initial setup, the derived NH value is associated with the NCC value one.

The MME shall not send the NH value to eNB at the initial connection setup. The eNB shall initialize the NCC value to zero after receiving S1-AP Initial Context Setup Request message.

Figure 11:
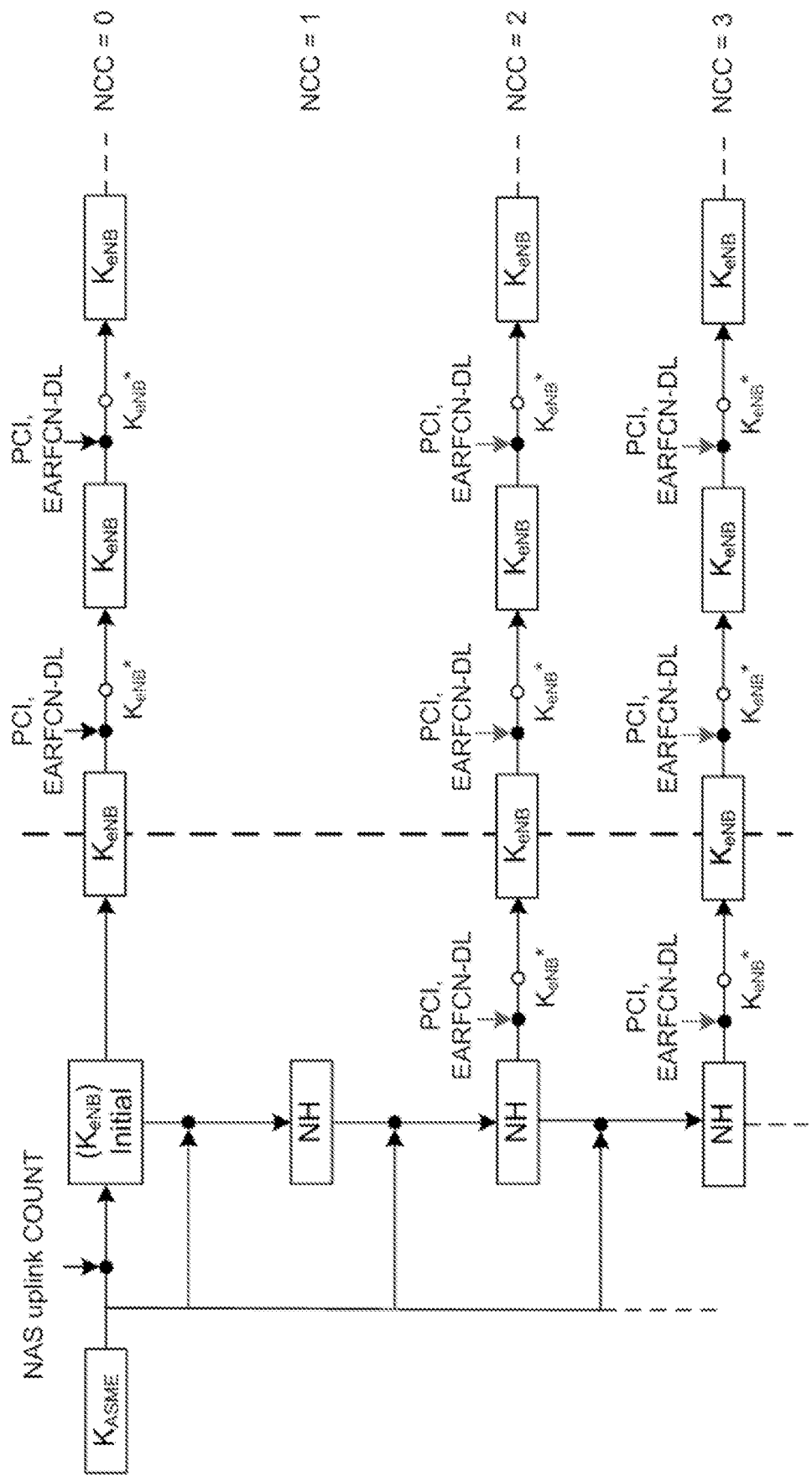
FIG. 11 is a schematic diagram illustrating an example of key handling during LTE handover.

The UE and the eNB use the $K_{eNB}$ to secure the communication between each other. On handovers, the basis for the $K_{eNB}$ that will be used between the UE and the target eNB, called $K_{eNB}^*$, is derived from either the currently active $K_{eNB}$ or from the NH parameter. If $K_{eNB}^*$ is derived from the currently active $K_{eNB}$ this is referred to as a horizontal key derivation and if the $K_{eNB}^*$ is derived from the NH parameter the derivation is referred to as a vertical key derivation (see FIG. 11). On handovers with vertical key derivation the NH is further bound to the target PCI and its frequency EARFCN-DL before it is taken into use as the $K_{eNB}$ in the target eNB. On handovers with horizontal key derivation the currently active $K_{eNB}$ is further bound to the target PCI and its frequency EARFCN-DL before it is taken into use as the $K_{eNB}$ in the target eNB. As NH parameters are only computable by the UE and the MME, it is arranged so that NH parameters are provided to eNBs from the MME in such a way that forward security can be achieved.

As mentioned, interworking/aggregation of radio access networks puts new requirements on efficient handling of authentication and security aspects. The proposed technology actually enables security for carrier aggregation between different radio access networks, such as a cellular network and a WLAN network.

Assuming carrier aggregation between different networks such as a cellular 3GPP network and WLAN is desirable, it may be useful for the WLAN access point or similar network node to be able to establish the security for the corresponding radio interface in a manner that makes carrier aggregation as simple as possible, but still sufficiently secure.

By way of example, using existing security procedures in WLAN may result in the access point not being able to establish sufficient security for the WLAN air interface, and not being able to know how to route the traffic to a certain radio base station such as an eNB. Existing security solutions may also result in an increased vulnerability to DoS attacks in the base station, e.g. an eNB, since if the WLAN interface is completely open an attacker can inject traffic anonymously towards the eNB via the access point.

It is desirable to provide the wireless device and the target network node such as the WLAN access point with keying material that can be used to establish a secure connection so that carrier aggregation can be performed in a sufficiently secure manner.

While a problem can generally be regarded as related to the issue of enabling security for carrier aggregation between different radio access networks, a number of related problems and/or sub-problems can optionally be defined:

How to establish a security association between the wireless device and the network node, such as a WLAN access point, of the target network to which the wireless device is to be off-loaded. This can be further subdivided into sub-problems, such as ensuring that the terminal learns the key(s), ensuring that the network node such as the WLAN access point learns the key(s) and so forth.

How to provide implicit authentication of the subscriber to the target network, such as a WLAN.

How to reduce complexity when attaching to the target network node such as a WLAN access point and how to securely remove the 4-way handshake.

Although some of the embodiments discussed in the following may be exemplified with respect to aggregation between LTE and WLAN, it should be understood that the proposed technology is equally applicable for aggregation between WLAN and other 3GPP RATs (e.g. UMTS), and 3GPP and non-3GPP RATs other than WLAN (e.g. WiMAX), or even between two 3GPP RATs (e.g. UMTS and LTE). Other combinations of different radio access networks for carrier aggregation also exist.

By way of example, 3GPP has decided to support carrier aggregation of LTE/WLAN. This means that LTE PDCP frames will travel over two paths between the UE and the eNB. The first path is the normal LTE-Uu interface. The second path is that the PDCP frames are sent over a WLAN radio interface to an AP and the AP will forward the PDCP frames to the eNB.

A particular problem that appears in this situation is how the security for the WLAN air interface shall be established between the UE and the AP. This needs to be done before the PDCP frames are passed from the UE via the AP to the eNB. Normal WLAN security today has two modes: WPA2-personal (also called WPA2-PSK) and WAP2-enterprise.

When WLAN security is established using the WPA2-personal mode according to existing specifications, a group key is installed in the AP and in all UEs. The UEs use this key to run a 4-way handshake with the AP to establish the security for the WLAN air interface. When the WPA2-enterprise is used, each UE is individually authenticated using an EAP-AKA procedure, which requires communication with a back-end AAA server for every authentication of a UE. The UEs then use a key established via the EAP-AKA procedure to run the 4-way handshake to establish security for the WLAN air interface. None of these take LTE/WLAN aggregation into account.

An objective in this regard is to solve the problem of how to effectively set up the WLAN security when the WLAN access is used as a part of LTE/WLAN aggregation. The proposed technology involves example embodiments that targets both the WPA2-personal case, and the WPA2-enterprise case. In at least some embodiment(s), the costly authentication process in WLAN is reduced or eliminated (depending on embodiment).

The cost and complexity reduction comes from assuming an implicit authentication of the UE to the AP (and vice versa) based on that the UE/AP has access to the correct keys for the WLAN air interface protection. These keys are derived in different ways so that only the correct UE/AP can derive them. Due to the implicit authentication, the EAP-AKA procedure and 4-way handshake may be eliminated (depending on embodiment).

In some example embodiment(s), keys for the WLAN air interface security are derived from keying material that originates from the KeNB. The KeNB is a user specific session key accessible in the eNB and the UE for the protection of the LTE air interface.

In other example embodiment(s), keys for the WLAN air interface security are derived from keying material that originates from an Operation and Maintenance, OAM, system. This keying material is common to all UEs in the group. This has implications on the security of the WLAN air interface security for some embodiments as will be discussed later on.

As an example, the proposed technology solves the previously stated particular problem to establish security for the WLAN air interface by configuring the second network node to establish an association that enables establishment of security for the WLAN air interface between the wireless device and the access point.

By way of example, assuming a use case where the owner of the WLAN system does not use the WPA-PSK way of authenticating users (the same key is used for all users, typically for homes and small enterprises), but the owner instead use an per-user EAP-based authentication, which establishes different keys for all users, then the owner may like to keep that trust model also for carrier aggregation. In other words, if the WLAN owner uses user-unique keys for WLAN access, then user unique keys should probably also be used for carrier aggregation. User unique keys can be obtained by realizing that we can base the keying material on the authentication in the cellular network, such as a 3GPP network like LTE.

By way of example, the proposed technology provides an integrated approach to handle security in WLAN/3GPP aggregation scenarios, where a UE that is already authenticated in 3GPP starts aggregating traffic over WLAN. Examples of some embodiments for an integrated approach to handle security when a UE's traffic is aggregated in 3GPP and WLAN:

1. No over the air WLAN security is applied for aggregated traffic
   a. For all the UEs that are accessing the WLAN AP for aggregation
   b. For UEs whose identity is already communicated from the 3GPP side to the WLAN AP/AC
2. The keys for over the air WLAN security are derived by the eNB and communicated to the AP and the UE
3. No PDCP security is applied for aggregated traffic Aggregation without Over-the-Air WLAN Security In general, there is provided a method and corresponding arrangement and computer program for supporting carrier aggregation between a WLAN and a cellular radio network such as a 3GPP network. The proposed technology involves unblocking a port for forwarding aggregated traffic of the wireless communication device to and from a network node of the cellular radio access network via a network node of the WLAN to allow aggregation without over-the-air WLAN security where the security of the aggregated traffic relies on PDCP.

By way of example, the method and corresponding arrangement and computer program are adapted to handle security in WLAN/3GPP aggregation scenarios, where a UE that is already authenticated in 3GPP starts aggregating traffic over WLAN.

In one example embodiment, no over-the-air WLAN security is employed and the security of the aggregated traffic solely relies on PDCP. In one realization of this embodiment, the WLAN AP provides a separate network identifier such as SSID for the traffic to be aggregated, and when UEs associate with this SSID, only the OSA (Open System Authentication) procedure (messages 1 to 7 of FIG. 7) are employed, and the port for forwarding the aggregated UE traffic to and from the eNB via the AP is unblocked. This step allows the AP to use the SSID to separate traffic that should not be protected over the WLAN air interface, and forward that traffic to the eNB. All traffic addressed to/from the UE via this SSID is then transmitted unencrypted over the WLAN AP, relying only on the PDCP security available at the eNB and UE. It can be noted that a rogue UE can generate a continuous stream of data and send it to the SSID allocated for aggregation, which the AP will route towards the eNB. PDCP security at the eNB will be able to identify that this is not a legitimate packet and the packet will be discarded. However, the continuous processing of this continuous stream of illegitimate packets can make the AP/eNB inaccessible to serve legitimate users/packets.

In other words, there is provided a method and corresponding arrangement and computer program for supporting carrier aggregation between a WLAN and a cellular radio network such as a 3GPP network. The proposed technology involves a network node of the WLAN providing a separate network identifier for the traffic to be aggregated, and employing, for a wireless communication device associating with this identifier, an association/authentication procedure such as the Open System Authentication procedure and then unblocking a port for forwarding the aggregated traffic of the wireless communication device to and from a network node of the cellular radio access network via the network node of the WLAN.

No over-the-air WLAN security is employed and the security of the aggregated traffic solely relies on PDCP.

Figure 12:
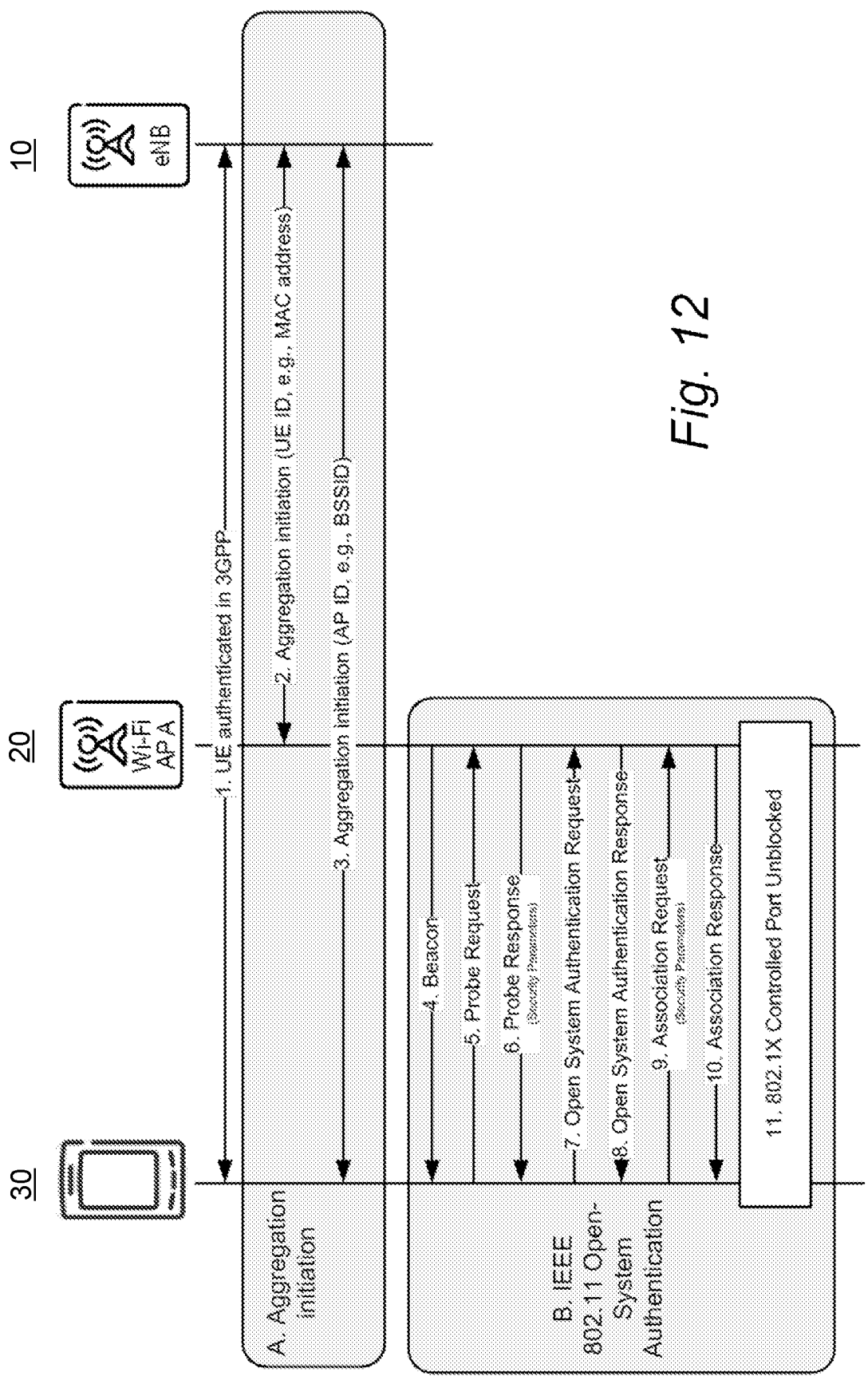
FIG. 12 is a schematic signaling diagram illustrating an example of the signaling related to aggregation with no over-the-air WLAN encryption and UE identity communication to the WLAN.

In another realization of this embodiment, illustrated in FIG. 12, no over the air WLAN security is employed only for the UEs whose identity is already communicated from the 3GPP side to the WLAN AP/AC and the security of the aggregated traffic of these UEs solely relies on PDCP. The authentication procedure comprises the following steps:

1. The UE 30 is authenticated in 3GPP;
2. Once it is decided that the UE should start aggregating traffic over WLAN, the eNB 10 introduces the UE 30 to the WLAN AP 20 by sending an aggregation initiation message that includes the UE ID. This ID can be a WLAN MAC address (if the 3GPP network is aware of it), IMSI or a combination of 3GPP and WLAN identifiers. This message can be sent, for example, using an eNB-AP interface;
3. The eNB 10 also introduces the WLAN AP 20 to the UE 30 by providing an aggregation initiation message that includes the WLAN AP ID (e.g. BSSID). This message can be provided, for example, via RRC signaling. The step(s) 2/3 informs the WLAN AP that the device (UE/STA) with the given identifier should be allowed to do the implicit authentication required for WLAN/3GPP aggregation;
4. The STA 30 receives a Beacon frame revealing (among other parameters) the security features associated with the ESS the AP belongs to.
5. If the STA 30 does not receive a Beacon frame for some reason, it can generate a Probe Request and send it to the AP. This procedure is called active scanning and by performing it, the STA can receive from the AP the same information as it would have from a Beacon message;
6. The AP 20 answers with Probe Response;
   a. NOTE: The discovery procedure consists of either step 4 or steps 5 and 6 (i.e., receiving a Beacon frame and exchanging probe messages are mutually exclusive).
7. The STA 30 sends an Open System Authentication Request
8. The AP 20 responds with an Open System Authentication Response;
9. The STA 30 then sends an Association Request, indicating the security parameters to be used later;
10. The AP 20 responds with an Association Response
11. At this point the Open System Authentication is completed. In normal completion of an OSA procedure, the STA 30 can communicate only with the AP—the rest of the traffic is blocked by the port-based network control (PBNC) enforcer, as defined in IEEE 802.1X. However, in the case of this embodiment, the AP/AC, when noticing that the UE's identity matches the one specified in the previously received aggregation initiation message will decide that no over the air-security is to be applied for this UE's data. In this step the AP 20 makes the decision to not apply any WLAN security for the given UE (and consider it authenticated). Thus, no IEEE 802.11 four way security handshake (see steps/messages 24 to 33 in FIG. 3) is required, and the port will be unblocked for forwarding aggregated UE data to and from the eNB 10 via the AP 20.

NOTE: The security aspects of some of these messages are redundant (e.g. in messages 4, 6, 9) as no security is going to be applied between the UE and AP. However, they are kept here to reuse the legacy messages as are. However an implementation can use stripped down messages that don't contain the security information.

In other words, there is provided a method and corresponding arrangement and computer program for supporting carrier aggregation between a WLAN and a cellular radio network such as a 3GPP network. The proposed technology involves a network node of the WLAN receiving information informing the WLAN network node that a wireless communication device with a specific identifier should be allowed for an implicit authentication for carrier aggregation, and employing, for a wireless communication device, an association/authentication procedure such as the Open System Authentication procedure and unblocking, if the identity of the associated wireless communication device matches the specific identifier, a port for forwarding the aggregated traffic of the wireless communication device to and from a network node of the cellular radio access network via the network node of the WLAN.

No over-the-air WLAN security is employed and the security of the aggregated traffic solely relies on PDCP.

The second realization is a bit more secure than the previous one, e.g. with respect to DoS attacks. For example, if an attacker gets hold of the UE ID (e.g. via sniffing the packets over the WLAN air interface), it can generate a continuous stream of data by faking the legitimate UE ID as its MAC address, which the AP will route towards the eNB as it identifies this to be an aggregated packet destined for the eNB. PDCP security at the eNB will be able to identify this is not a legitimate packet and the packet will be discarded. However, the continuous processing of this continuous stream of illegitimate packets can make the AP/eNB inaccessible to serve legitimate users/packets.

Aggregation with Over-the-Air WLAN Security

Figure 13:
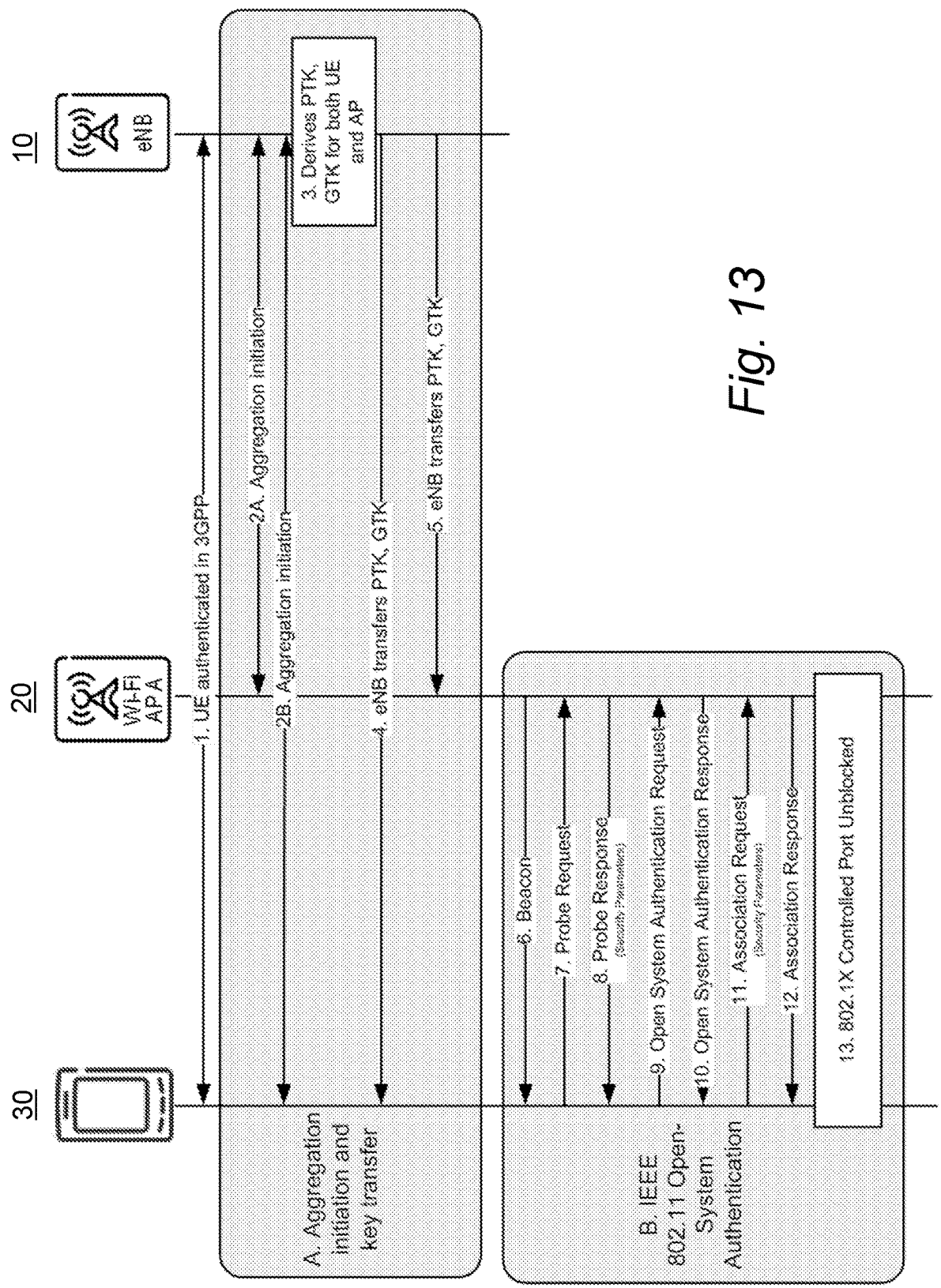
FIG. 13 is a schematic signaling diagram illustrating an example of the signaling related to aggregation with over-the-air WLAN encryption.

If desired, in order to solve the security issues associated with the mechanism disclosed in the previous embodiment, over-the-air WLAN encryption is enforced between the UE and the AP. In one example embodiment, illustrated in FIG. 13, the eNB 10 computes and provides the over-the-air encryption keys to both the AP 20 and the UE 30 (the over-the-air encryption keys include the key used to encrypt unicast traffic, the PTK and the key to encrypt the broadcast/multicast traffic, the GTK).

The authentication procedure comprises the following steps:

1. The UE 10 is authenticated in 3GPP.
2. It is decided (e.g, eNB, UE or some other network entity) that the UE should start aggregating traffic over WLAN, and aggregation initiation is performed between the eNB 10, UE 30, and AP 20.
3. The eNB 10 computes the keys for both the unicast (PTK) and broadcast/multi-cast (GTK) to be used by the UE 30 and AP 20. This is a step where the eNB computes the session keys for the WLAN air interface so that the UE and the AP does not need to run the 4-way handshake later. The keys may be computed such that they are based on the key $K_{eNB}$ directly or indirectly. The key $K_{eNB}$ is shared between the eNB and the UE.
4. The eNB 10 communicates the security keys to the UE 30.
5. The eNB 10 communicates the security keys to the AP 20.

a. NOTE: an implementation can combine messages 2 and 4/5 (i.e. perform the computation of the keys first and send the security keys along with the aggregation initiation messages)
b. NOTE: The GTK, doesn't necessarily have to be sent to the AP all the time. It suffices if it is sent only the first time a UE is being aggregated over the concerned AP.
c. NOTE: The GTK and PTK can be computed and sent to the UE even before the UE is in the coverage area of WLAN. For example, these can be sent at the end of UE authentication in 3GPP (message 1). These two steps 4, 5 explain how the eNB distributes the session keys to the UE and the AP.
6. The STA 30 receives a Beacon frame revealing (among other parameters) the security features associated with the ESS the AP belongs to. Note that the term STA is used here to emphasize the WLAN persona of the wireless device. It is the same wireless device referred to as UE in the previous steps where the LTE persona of the wireless device was emphasized;
7. If the STA 30 does not receive a Beacon frame for some reason, it can generate a Probe Request and send it to the AP. This procedure is called active scanning and by performing it, the STA can receive from the AP the same information as it would have from a Beacon message;
8. The AP 20 answers with Probe Response;
a. NOTE: The discovery procedure consists of either step 6 or steps 7 and 8 (i.e., receiving a Beacon frame and exchanging probe messages are mutually exclusive).
9. The STA 30 sends an Open System Authentication Request
10. The AP 20 responds with an Open System Authentication Response;
11. The STA 30 then sends an Association Request, indicating the security parameters to be used later;
12. The AP 20 responds with an Association Response
13. At this point the Open System Authentication is completed. In normal completion of an OSA procedure, the STA 30 can communicate only with the AP 20—the rest of the traffic is blocked by the port-based network control (PBNC) enforcer, as defined in IEEE 802.1X. However, in the case of this embodiment, the over the air security information has already been communicated to the AP 20 and UE 30, and as such no IEEE 802.11 four way security handshake (see FIG. 15) is required, and the port will be unblocked for forwarding aggregated UE data to and from the eNB via the AP. Here is the novel effect that there is no need to run any 4-way handshake in WLAN.

NOTE: The security aspects of some of these messages are redundant (e.g. in messages 6, 8, 11) as the security information is already provided to the UE and AP before the OSA is started. However, they are kept here to reuse the legacy messages as are. However an implementation can use stripped down messages that don't contain the security information.

In step 3 of the above message, the eNB computes both the PTK and GTK based on some master key (for example, $K_{eNB}$), and sends it to the UE in step 4. However, as the UE already has the $K_{eNB}$, the eNB can send in step 4 only the $A_{Nonce}$ or other random number that it is using to derive the keys, and the UE can derive the keys by its own. This step is an optimization of step 4 above: the eNB does not need to send the entire PTK/GTK, but can send a freshness parameter from which the UE can derive the PTK/GTK using the $K_{eNB}$.

Aggregation without PDCP Security

In another example embodiment of this invention, only over the WLAN security is employed for WLAN aggregated traffic (UE→WLAN AP→eNB in the uplink and eNB→WLAN AP→UE in the downlink) and PDCP level security is disabled for aggregated traffic through the AP. This doesn't directly suffer from the security vulnerabilities (such as DoS attacks) of the first embodiment (no over the air WLAN security). However, especially for the sake of the AP not co-located with the eNB, the possible lack of physical security of the AP can open the door for the AP to be compromised by an attacker. For example, if PDCP level aggregation was employed, that means, data from the compromised AP can directly be injected to the operator's EPC, as there will be no PDCP level security to stop the illegitimate traffic.

In the example embodiments above, the keying material used to establish the WLAN key is rooted in the (LTE) authentication. This normally means that the keys are unique per UE. In typical home and in some office deployments, the same WLAN key may however be used for all devices, e.g., a WEP key or a WPA2-PSK key. Using a UE unique key does not fit that model.

In an alternative approach WLAN APs are configured with one key for all regular WLAN-only devices as usual, and the LTE/WLAN aggregation UEs and WLAN APs are configured with a common key, preferably without user involvement.

1. In a first example embodiment of this particular approach, a key usable by all members of a group (the PSK in WPA2-PSK) is provisioned in a number of WLAN APs from an OAM system. An identifier is associated with the group of WLAN APs. This identifier is provisioned in the eNB by the OAM system. When the eNB starts LTE/WLAN aggregation, it provides the UE with the WLAN AP identifier to connect to and the key to use. The UE runs the 4-way WPA2-PSK handshake to establish the PTK and GTK between the UE and the WLAN AP the UE associates with.
2. In a second example embodiment, an OAM server provisions the PMK and the WLAN AP identifier to the UE. The OAM server also provisions the key to the WLAN APs as in the first embodiment. The UE runs the 4-way WPA2-PSK handshake to establish the PTK and GTK between the UE and the WLAN AP the UE associates with.
3. In a third example embodiment, the OAM system configures the GTK and the PTK in the WLAN APs and UEs directly. In this case, the UE and WLAN AP do not run the 4-way handshake to establish UE-unique PTK. That is, all UEs share the same PTK.

In this way, the system may be more in line with current enterprise type of WLAN deployments when it comes to having one security key for all members.

The system allows deploying a WLAN key to the UE without user intervention. This could be re-used for normal WLAN access also (not only for aggregation type access).

It is easy to change the key frequently for the aggregating UEs.

In the first example embodiment of the above approach, the OAM system provides the eNB(s) with an identifier for the group of WLAN APs and the PMK to use with the group of WLAN APs. This step provides the eNB with a identifier and WLAN keying material to be used for protecting the WLAN air interface during carrier aggregation. A session here is just the life-time of the key; it is not necessarily connected to the aggregation session. Note that there may be more than one eNB that is prepared.

The OAM system also provides the same information to the WLAN APs if necessary (it is not necessary if the WLAN APs have already obtained this information elsewhere). Here is the step where the OAM server provides the AP with corresponding information so that it can partake in the carrier aggregation. The eNB provides the UE with the PMK and AP ID over the secure LTE RRC channel before the LTE/WLAN aggregation begins. Here is the step where the eNB provides the necessary info to the UE so that the UE can start communicate with the AP.

The term AP ID here should be interpreted in the sense of any identifier that can be used by the UE to identify any of the APs that are prepared for LTE/WLAN aggregation. An example of such an identifier is the ESSID, possibly shared by multiple WLAN APs.

Figure 14:
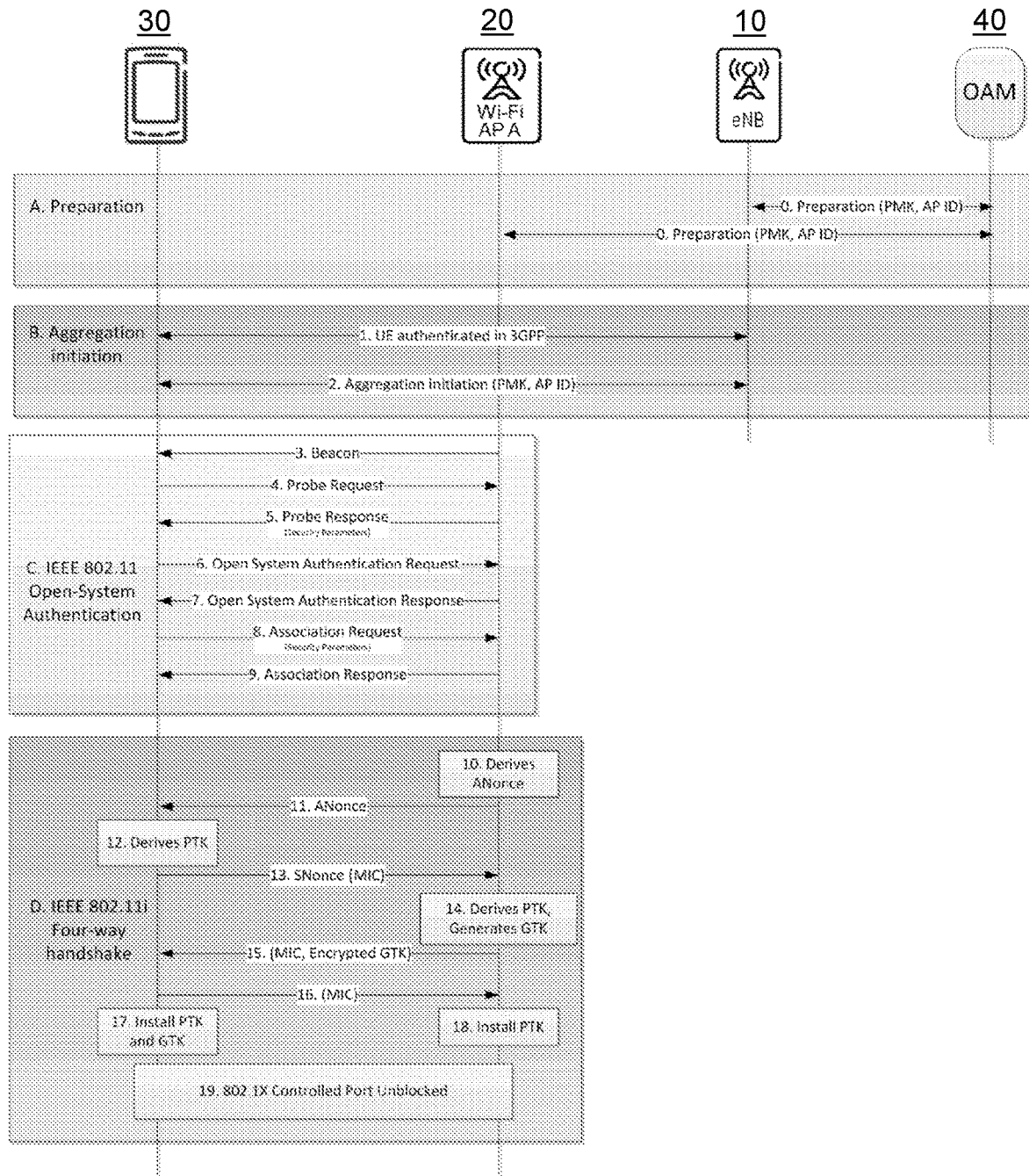
FIG. 14 is a schematic signaling diagram illustrating an example involving a key establishment procedure according to an embodiment.

In this example, as illustrated in FIG. 14, the key establishment procedure is as follows:

0. In the preparation step the OAM system 40 sends the PMK and the AP ID to the eNB(s) 10 that may participate in the LTE/WLAN aggregation. The OAM system 40 may similarly prepare the WLAN AP(s) 20 if those have not yet been prepared by other means.
1. The STA 30 is authenticated in 3GPP as a UE;
2. It is decided (e.g. by the eNB, STA or other entity) that the STA 30 should start aggregating traffic over WLAN, and aggregation initiation is performed between the eNB 10, STA 30, and AP 20. Even though the AP may be involved in the aggregation initiation, this is not shown in FIG. 7 for simplicity. The eNB 10 communicates the security key (which is the PMK in WPA2 terminology) to the STA 30 over the secure LTE-RRC protocol. The eNB 10 also communicates the AP ID with which the key should be used; this could be combined with step 2;
3. The STA 30 receives a Beacon frame revealing (among other parameters) the security features associated with the ESS the AP belongs to;
4. If the STA 30 does not receive a Beacon frame for some reason, it can generate a Probe Request and send it to the AP 20. This procedure is called active scanning and by performing it, the STA can receive from the AP the same information as it would have from a Beacon message;
5. The AP 20 answers with Probe Response;
6. The STA 30 sends an Open System Authentication Request
7. The AP 20 responds with an Open System Authentication Response;
8. The STA 30 then sends an Association Request, indicating the security parameters to be used later;
9. The AP 20 responds with an Association Response
10. The AP 20 uses the PMK to generate an Authenticator nonce (ANonce);
11. The ANonce value is sent to the STA 30;
12. Using the received ANonce (together with the SNonce and the PMK), the STA 30 constructs the Pairwise Temporal Key (PTK);
13. The STA 30 sends a message to the AP, including a Supplicant nonce (SNonce) and a message integrity code (MIC);
14. The AP 20 uses the ANonce, SNonce and the PMK to construct the PTK. The AP also uses the MIC in order to verify that the STA has computed the correct and fresh key. Furthermore, the AP also installs a Group Temporal Key (GTK, which is used exclusively for the encryption and decryption of broadcast and multicast traffic;
15. The AP 20 sends to the STA 30 an encrypted GTK, a sequence number to use for the next broadcast message and an instruction to install the PTK (the message is integrity protected by another MIC);
16. The STA 30 responds with an acknowledgement message;
17. The STA 30 installs both the PTK and the GTK and as of this point uses them to encrypt and decrypt all communication;
18. The AP 20 also installs the PTK;
19. The four way handshake is now complete and the 802.1X Controlled Port is now open and the STA 30 can communicate with other network hosts besides the AP. In some embodiments, the traffic is restricted to only be forwarded to an eNB involved in LTE/WLAN aggregation. The latter is the main case for this invention.

Figure 15:
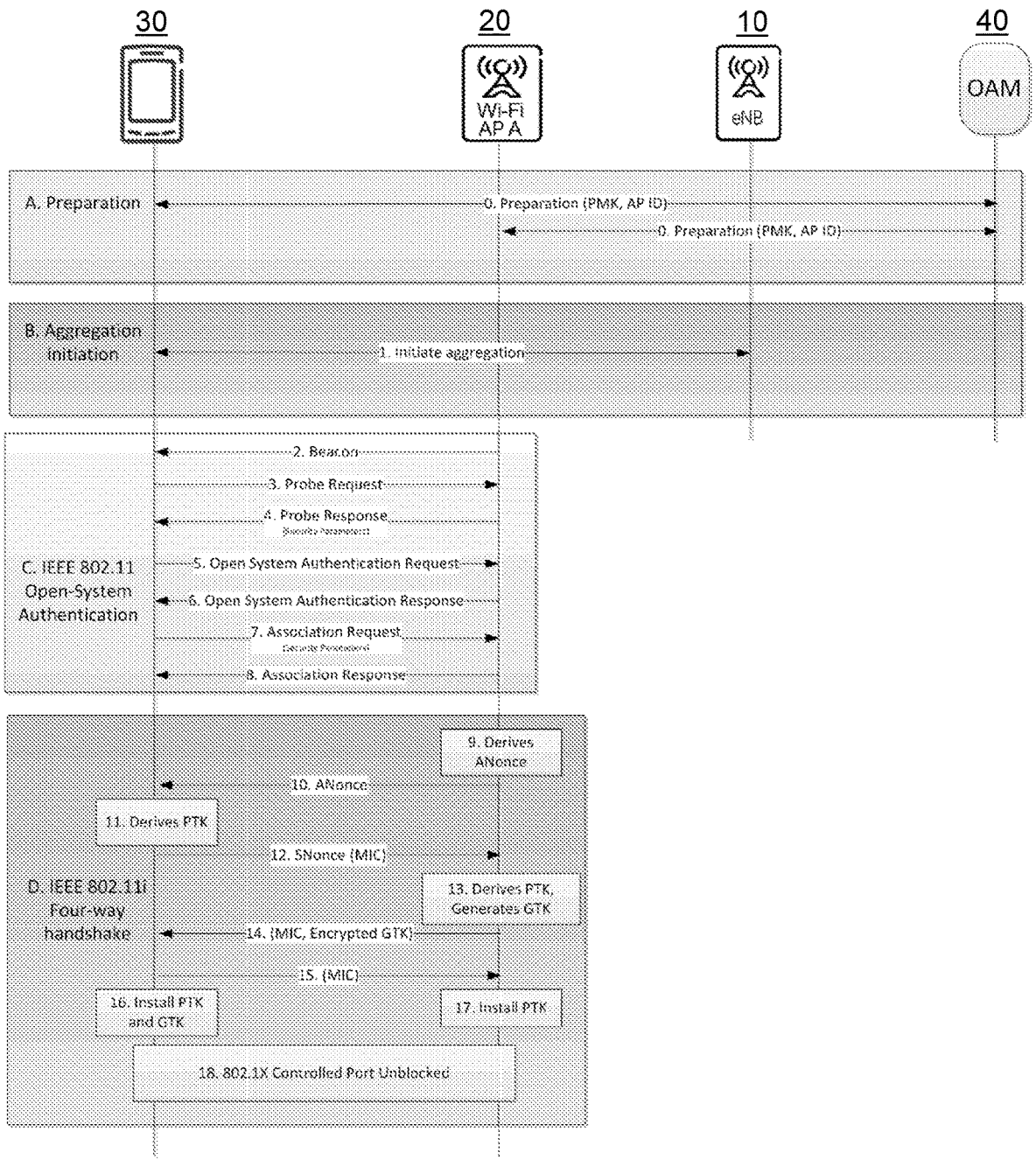
FIG. 15 is a schematic signaling diagram illustrating another example involving a key establishment procedure according to another embodiment.

In another example embodiment, the STA 30 receives the security parameters directly from the OAM system 40, and not from the eNB. In this step the parameter(s) is/are not passed via the eNB to the UE, but directly to the UE from the OAM server. This could be achieved via, e.g., OMA-DM (Open Mobile Alliance Device Management). A benefit with this approach is that there will be no impact on the LTE RRC protocol for the security parts. It could, however, be argued that big changes are necessary to the STA baseband anyhow for LTE/WLAN aggregation. This embodiment is depicted in FIG. 15.

An example of the key establishment procedure is as follows. The main differences to the previous embodiment is the initial preparation phase, and that steps related to the eNB provisioning parameters to the STA and the APs are removed.

0. In the preparation step the OAM system 40 sends the PMK and the AP ID to the STA 30. The delivery channel could be over the 3GPP network or any other path. The OAM system 40 also prepares the WLAN AP(s) 20 with the same parameters if the APs have not yet been prepared by other means.
1. It is decided (e.g., by the eNB, STA or other entity) that the STA should start aggregating traffic over WLAN, and aggregation initiation is performed between the eNB 10, STA 30, and AP 20. Even though the AP may be involved in the aggregation initiation, this is not shown in FIG. 8 for simplicity.
2. The STA 30 receives a Beacon frame revealing (among other parameters) the security features associated with the ESS the AP belongs to;
3. If the STA 30 does not receive a Beacon frame for some reason, it can generate a Probe Request and send it to the AP 20. This procedure is called active scanning and by performing it, the STA can receive from the AP the same information as it would have from a Beacon message;
4. The AP 20 answers with Probe Response;
5. The STA 30 sends an Open System Authentication Request
6. The AP 20 responds with an Open System Authentication Response;
7. The STA 30 then sends an Association Request, indicating the security parameters to be used later;
8. The AP 20 responds with an Association Response 9. The AP 20 uses the PMK to generate an Authenticator nonce (ANonce);
10. The ANonce value is sent to the STA 30;
11. Using the received ANonce (together with the SNonce and the PMK), the STA 30 constructs the Pairwise Temporal Key (PTK);
12. The STA 30 sends a message to the AP, including a Supplicant nonce (SNonce) and a message integrity code (MIC);
13. The AP 20 uses the ANonce, SNonce and the PMK to construct the PTK. The AP 20 also uses the MIC in order to verify that the STA has computed the correct and fresh key. Furthermore, the AP 20 also installs a Group Temporal Key (GTK, which is used exclusively for the encryption and decryption of broadcast and multicast traffic;
14. The AP 20 sends to the STA 30 an encrypted GTK, a sequence number to use for the next broadcast message and an instruction to install the PTK (the message is integrity protected by another MIC);
15. The STA 30 responds with an acknowledgement message;
16. The STA 30 installs both the PTK and the GTK and as of this point uses them to encrypt and decrypt all communication;
17. The AP 20 also installs the PTK;
18. The four way handshake is now complete and the 802.1X Controlled Port is now open and the STA 30 can communicate with other network hosts besides the AP. In some embodiments, the traffic is restricted to only be forwarded to an eNB involved in LTE/WLAN aggregation. The latter is the main case for this invention.

In the third example embodiment, the four way handshake is removed and the UE and the WLAN AP can start communication after the open authentication association procedure. This is a difference compared to the other two embodiments of the above approach: the UE gets the PTK/GTK directly instead of the PMK. Since the UE gets these keys, there is no need for the 4-way handshake. This is depicted in FIG. 16.

Figure 16:
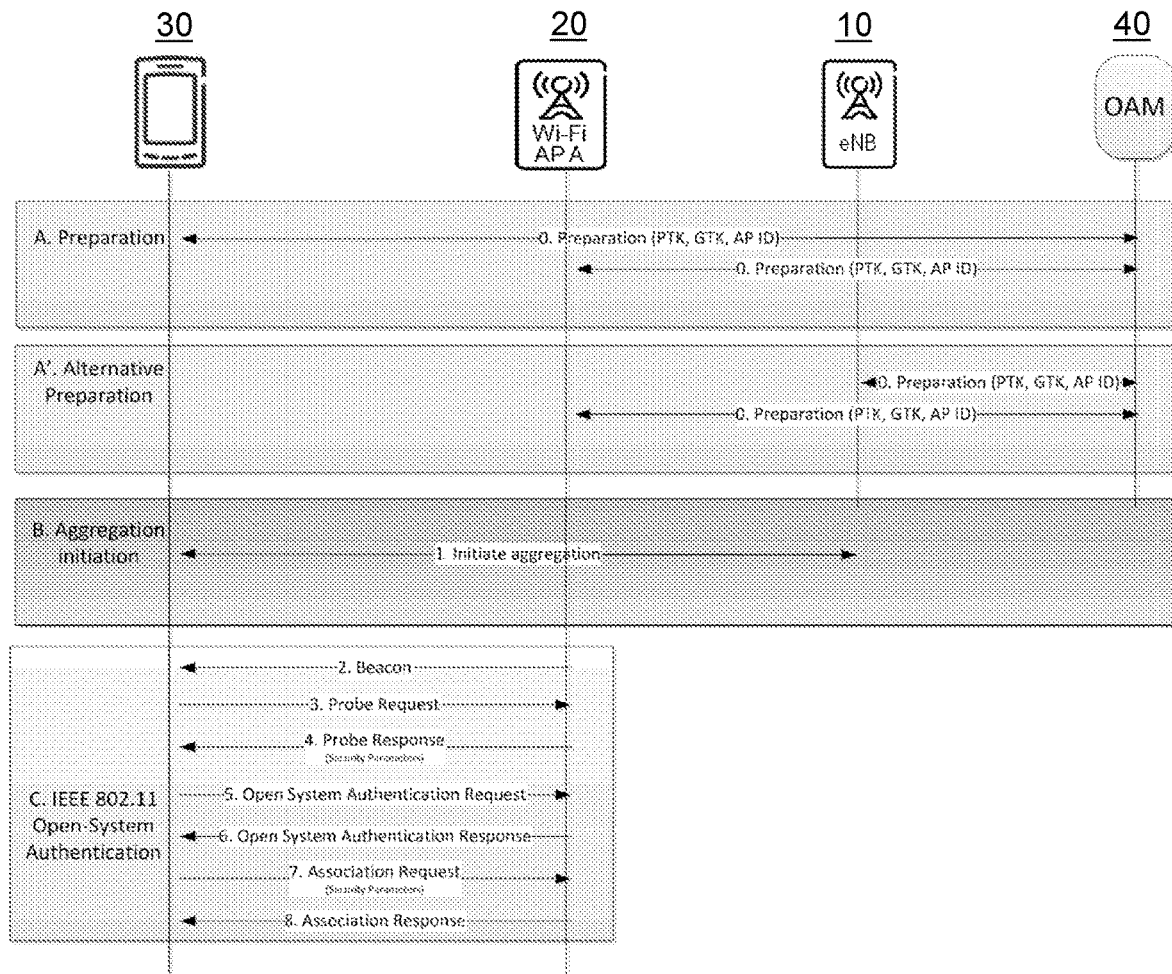
FIG. 16 is a schematic signaling diagram illustrating yet another example involving a key establishment procedure according to yet another embodiment.

FIG. 16 shows two variations on the preparation step A and A'. These correspond to the preparation steps of the first and second embodiments described above. The difference compared to the preparation steps in those embodiments is that here the OAM system 40 distributes a PTK and GTK instead of a PMK. Since the UE 30 and AP 20 already have access to the PTK and GTK the four way handshake to establish these keys can be skipped.

Security Considerations on the Optimization

When the optimization is made so that all STAs use the same PTK, one may be concerned that there is a risk for key stream re-use. Whether this can happen or not depends on the actual encryption protocol used. WPA2-PSK can use either the Temporal Key Integrity Protocol (TKIP) or the Counter Mode Cipher Block Chaining Message Authentication Code Protocol (CCMP).

Regardless whether TKIP or CCMP is used, the actual encryption key is generated from the PTK. Before encrypting a message TKIP performs two transformations on the PTK. The first transform consists of XORing the PTK with the MAC address of the STA. This produces an intermediate key which is unique per STA with very high probability (the MAC address needs to be unique for each STA that is connected to the same AP for the scheduling to work). The second transform consists of encrypting the message sequence number with the intermediate key. The result of this encryption is the actual encryption key. These two transforms ensure that each message is encrypted using a key that is both unique per STA and unique per packet.

It should be noted that if the STA would connect once more to an AP using the same PTK, there will be key stream re-use. This is because there is no new fresh input to the derivation of the actual encryption key and the message sequence numbers restart from 0. This applies even if the STA starts aggregation with another AP that is configured to use the same PTK.

To circumvent this problem, the STA and AP can perform a novel transformation of the PTK before any processing by TKIP or CCMP. One option is that the AP and the STA agree on a freshness parameter during the aggregation initiation. For example the eNB could transmit a random value, a counter, a granular timestamp or any other parameter that will be unique for this particular aggregation. The term unique should in the previous sentence be read to mean never used before with this particular PTK for any STA. If, for example, the eNB uses a 64-bit counter as a freshness value, the eNB can increase the counter for each aggregation to a particular set of APs. When the counter wraps around, the eNB can send a signal to the OAM system to configure a new PTK in the APs and UEs.

Since all members of the group have access to the PTK, and can either be assumed to know or guess the MAC address of the other members, it is possible for other members of the group to spoof messages so that they appear to originate from another member. This is however part of the trust model for WPA2-PSK when used with a pre-configured key or pass phrase as per the current specification. The reason for this is that in the current specification of WPA2-PSK, all members of the group have access to the PMK. The ANonce and SNonce for a given STA can be intercepted by these other members, and they can then derive the PTK for the given STA. Therefore, security is not degraded by the proposed technology.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs). Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

The proposed technology provides a first network node configured to support carrier aggregation between different radio access networks, wherein the first network node is adapted for operation in a first radio access network. The first network node is adapted to configure a second network node of a second radio access network with keying material. The first network node is also adapted to configure the second network node to establish an association with a wireless device associated with a given identifier based on/associated with said keying material. The first network node is further adapted to configure said second network node to forward data from the wireless device to said first network node.

By way of example, the first network node may be adapted to configure the wireless device with information enabling the wireless device to derive the keying material.

Optionally, the first network node may be adapted to configure the wireless device with a network identifier associated with the second network node, enabling the wireless device to establish the association with the configured second network node.

In a particular example, the first network node may be adapted to configure the second network node with keying material to enable establishment of a security association between the wireless device and the second network node for encryption of over-the-air traffic.

As an example, the first network node may be a base station of a cellular radio access network, and the second network node may be an access point of a Wireless Local Area Network, WLAN.

In a particular example, the first network node may be adapted to configure the access point to enable establishment of security for the WLAN air interface between the wireless device and the access point.

The proposed technology also provides a second network node configured to support carrier aggregation between different radio access networks, wherein the second network node adapted for operation in a second radio access network. The second network node is adapted to receive configuration for establishing an association with a wireless device. The second network node is also adapted to announce a network identifier. The second network node is adapted to establish the association with the wireless device if the wireless device connected to the second network node using the network identifier. The second network node is further adapted to receive data from the wireless device and forward the data to a first network node of a first radio access network.

By way of example, the second network node may be adapted to receive configuration comprising keying material.

In a particular example, the second network node may be adapted to receive configuration comprising keying material that enables encryption of over-the-air traffic.

For example, the second network node may be adapted to establish the association as a security association between the wireless device and the second network node.

As an example, the second network node may be an access point of a Wireless Local Area Network, WLAN, and the first network node may be a base station of a cellular radio access network.

In this particular example, the second network node may be adapted to establish an association to enable establishment of security for the WLAN air interface between the wireless device and the access point.

By way of example, the second network node may be adapted to unblock a port for forwarding aggregated UE data to and from the base station via the access point.

Optionally, the second network node may be adapted to disable Packet Data Convergence Protocol, PDCP, level security for aggregated traffic through the access point and employ only over-the-WLAN security for WLAN aggregated traffic. The proposed technology provides a wireless device configured to support carrier aggregation between different radio access networks. The wireless device is adapted to receive information for establishing an association with a network node of a radio access network, said information comprising a network identifier. The wireless device is also adapted to establish an association with the network node using the network identifier. The wireless device is further adapted to send, to the network node, data targeted for another network node of a different radio access network.

By way of example, the wireless device may be adapted to receive information comprising keying material.

In a particular example, the wireless device may be adapted to derive a key based on at least the received information and using the key to establish the association with the network node.

For example, the wireless device may be adapted to establish the association based on exchange of random value(s) between the second network node and the wireless device, enabling generation of a key using said random value(s) and the derived key.

In a particular example, the key(s) enables encryption of over-the-air traffic.

As an example, the wireless device may be adapted to establish the association as a security association between the wireless device and the second network node.

For example, the wireless device may be adapted to establish the security association as a WLAN security association.

As an example, the first radio access network may be a cellular radio access network and the second radio access network a Wireless Local Area Network, WLAN, and the first network node may be a base station and the second network node an access point.

By way of example, the wireless device may be a User Equipment, UE, and/or wireless station, STA.

With particular reference to the provisioning of keying material, a specific aspect of the proposed technology can be summarized as relating to an arrangement for supporting carrier aggregation between different radio access networks. The arrangement is configured to provide keying material to an access point of a Wireless Local Area Network, WLAN, to enable establishment of a security association between the access point and a wireless device to ensure over-the-air WLAN security for carrier aggregation when forwarding traffic data of the wireless device to and from a base station of a cellular radio access network via the access point.

By way of example, the arrangement may be a network node or implemented as part of a network node or functional system.

For example, there is provided a base station 10 comprising such an arrangement.

In a particular example, the base station 10 may be configured to provide the keying material to the wireless device, and the keying material may be unique per wireless device.

Alternatively, there is provided an operation and maintenance, OAM, system 40 comprising such an arrangement.

The OAM system 40 is configured to support carrier aggregation between a cellular radio access network and a Wireless Local Area Network, WLAN.

As previously indicated, the OAM system 40 may for example be configured to provide keying material to a WLAN access point to enable establishment of a security association between the access point and a wireless device for protecting the WLAN air interface during carrier aggregation.

By way of example, the OAM system 40 may be configured to provide the keying material to the wireless device directly or via a base station of the cellular radio access network.

For example, the OAM system 40 may be configured to provide the keying material together with an identifier associated with a group of WLAN access points to a base station of the cellular radio access network to enable the base station to provide the wireless device with the keying material and the identifier.

In a particular example, the OAM system 40 may be configured to provide keying material that is common for a group of wireless devices.

Preferably, the OAM system 40 may for example be configured to provide keying material that comprises at least one security key for over-the-air encryption.

In a particular example, the network node(s) and/or wireless device and/or arrangement each comprises a processor and a memory, wherein the memory comprises instructions executable by the processor, whereby the processor is operative to perform the above method(s) described herein, and especially to support carrier aggregation.

Figure 17:
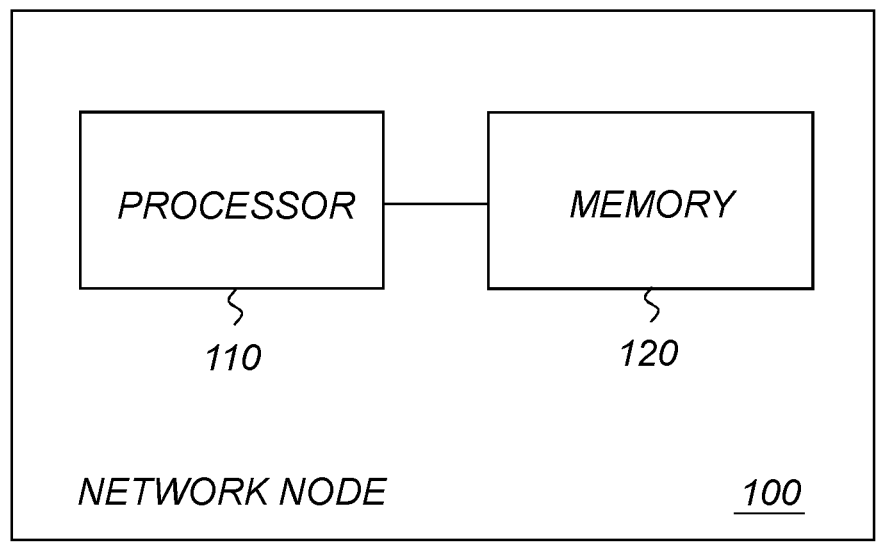
FIG. 17 is a schematic block diagram illustrating an example of a network node comprising a processor and an associated memory according to an embodiment.

FIG. 17 is a schematic block diagram illustrating an example of a network node 100 comprising a processor 110 and an associated memory 120. The network node 100 may be first network node and/or the second network node discussed above.

Figure 18:
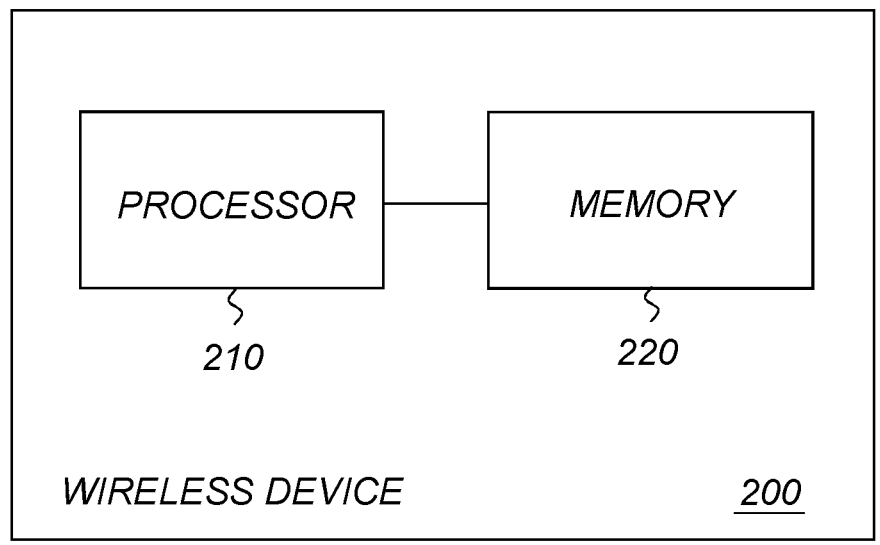
FIG. 18 is a schematic block diagram illustrating an example of a wireless device comprising a processor and an associated memory.

FIG. 18 is a schematic block diagram illustrating a wireless device 200 comprising a processor 210 and an associated memory 220.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

Figure 19:
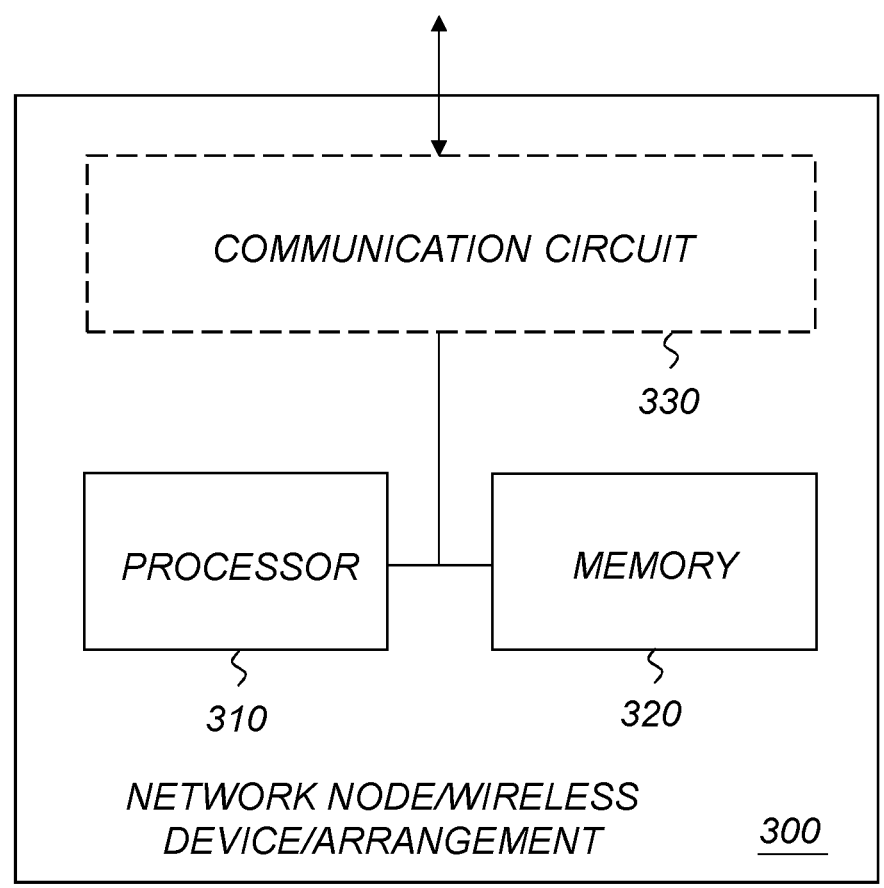
FIG. 19 is a schematic block diagram illustrating an example of a network node/wireless device comprising a processor, an associated memory and an optional communication circuit.

The processing circuitry does not have to be dedicated to only execute the above-described steps, functions, procedure and/or blocks, but may also execute other tasks. Optionally, the network node(s) and/or the wireless device and/or arrangement(s) may also include communication circuitry, as illustrated in FIG. 19. In this example, the network node/wireless device 300 comprises a processor 310, memory 320 and a communication circuit 330. The communication circuit 330 may include functions for wired and/or wireless communication with other devices and/or network nodes in the network. In a particular example, the network node/wireless device/arrangement may include radio circuitry for communication with one or more other nodes, including transmitting and/or receiving information. The communication circuit 330 may be interconnected to the processor 310 and/or memory 320.

Figure 20:
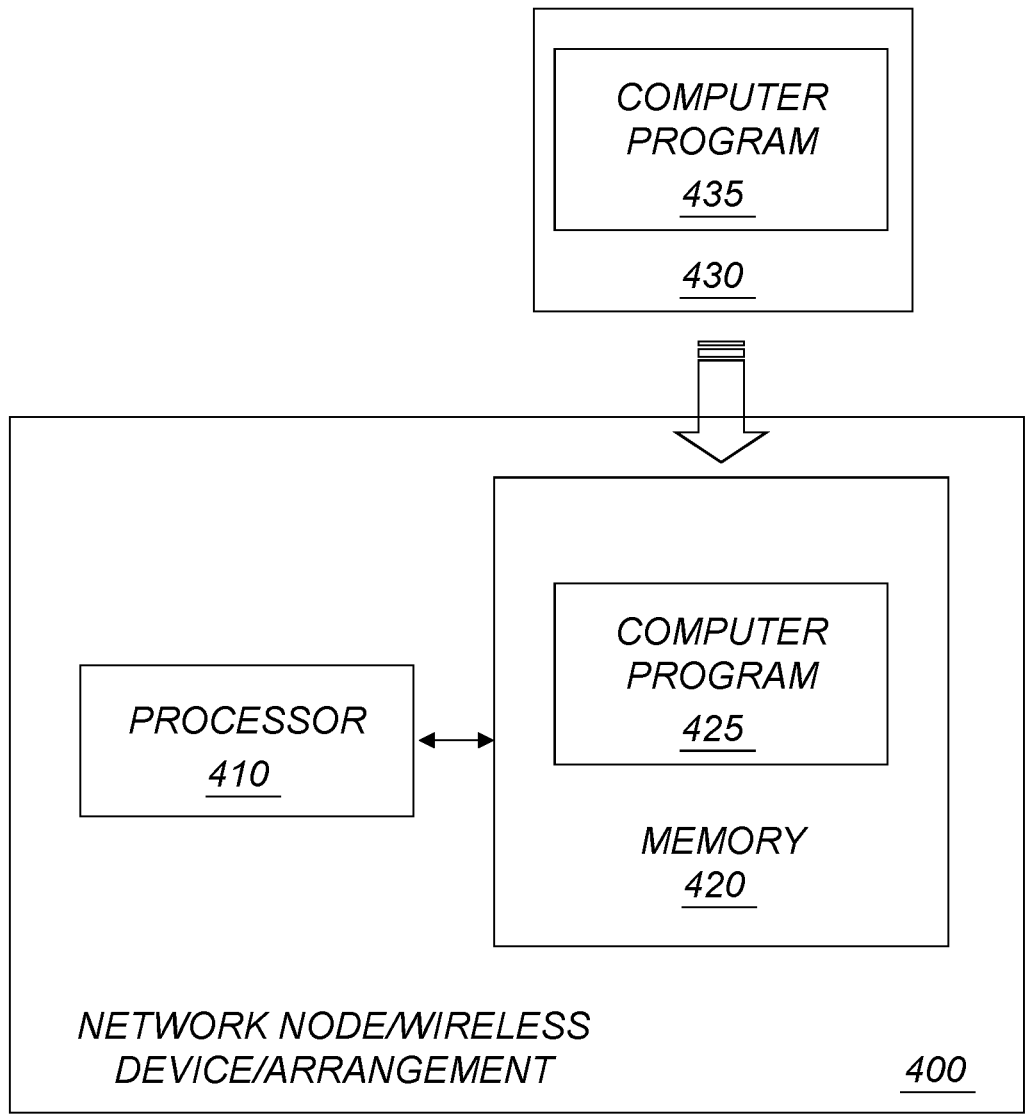
FIG. 20 is a schematic block diagram illustrating an example of a network node/wireless device based on a computer program implementation for execution on a processor.

In a particular example, with special reference to FIG. 20, at least some of the steps, functions, procedures, modules and/or blocks described herein are implemented in a computer program 425; 435, which is loaded into the memory 420; 430 for execution by processing circuitry including one or more processors 410. The processor(s) 410 and memory 420 are interconnected to each other to enable normal software execution. An optional input/output device may also be interconnected to the processor(s) and/or the memory to enable input and/or output of relevant data such as input parameter(s) and/or resulting output parameter(s).

In a particular embodiment, there is provided a computer program for supporting, when executed by at least one processor, carrier aggregation between different radio access networks, the computer program comprising instructions, which when executed, cause the at least one processor to:
provide keying material for configuration of a network node of a radio access network; and
provide a configuration of the network node to establish an association with a wireless device associated with a given identifier based on said keying material; and
provide a configuration of the network node to forward data from the wireless device to another network node of a different radio access network.

In another particular embodiment, there is provided a computer program for supporting, when executed by at least one processor, carrier aggregation between different radio access networks, the computer program comprising instructions, which when executed, cause the at least one processor to:
receive configuration for establishing an association with a wireless device;
determine a network identifier;
establish the association with the wireless device if the wireless device connected to a network node, of a radio access network, using the network identifier; and
receive data from the wireless device and forward the data to another network node of a different radio access network.

In yet another particular embodiment, there is provided a computer program for supporting, when executed by at least one processor, carrier aggregation between different radio access networks, the computer program comprising instructions, which when executed, cause the at least one processor to:
receive information for establishing an association with a network node of a radio access network, said information comprising a network identifier;
establish an association with the network node using the network identifier; and
send, towards the network node, data targeted for another network node of a different radio access network.

As previously indicated, the network identifier may be, e.g. a network node identifier.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program described herein may be realized as a computer program product, which is normally carried or stored on a computer-readable medium 420; 430, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD)

storage device, a flash memory, a magnetic tape, or any other conventional memory device. The computer program may thus be loaded into the operating memory of a computer or equivalent processing device for execution by the processing circuitry thereof.

The flow diagram or diagrams presented herein may therefore be regarded as a computer flow diagram or diagrams, when performed by one or more processors. A corresponding wireless device and/or network node may be defined as a group of function modules, where each step performed by the processor corresponds to a function module. In this case, the function modules are implemented as a computer program running on the processor. Hence, the wireless device and/or network node may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein.

Figure 21:
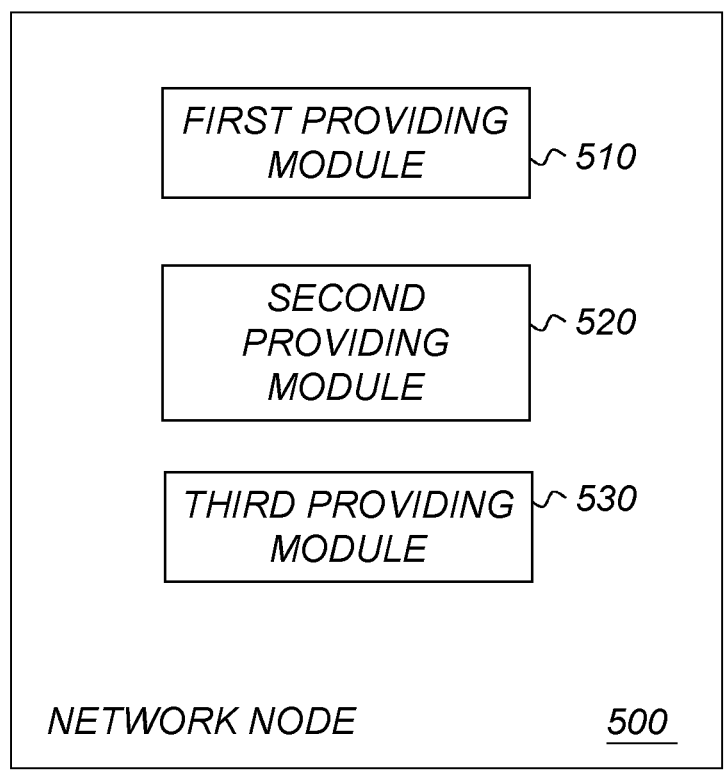
FIG. 21 is a schematic block diagram illustrating an example of a network node comprising a group of function modules.

FIG. 21 is a schematic block diagram illustrating an example of a network node comprising a group of function modules. The network node is denominated as a first network node for supporting carrier aggregation between different radio access networks, wherein the first network node is adapted for operation in a first radio access network. The first network node 500 comprises:
  a first providing module 510 for providing keying material for configuration of a second network node of a second radio access network;
  a second providing module 520 for providing configuration of the second network node to establish an association with a wireless device associated with a given identifier based on said keying material; and
  a third providing module 530 for providing configuration of the second network node to forward data from the wireless device to the first network node.

Figure 22:
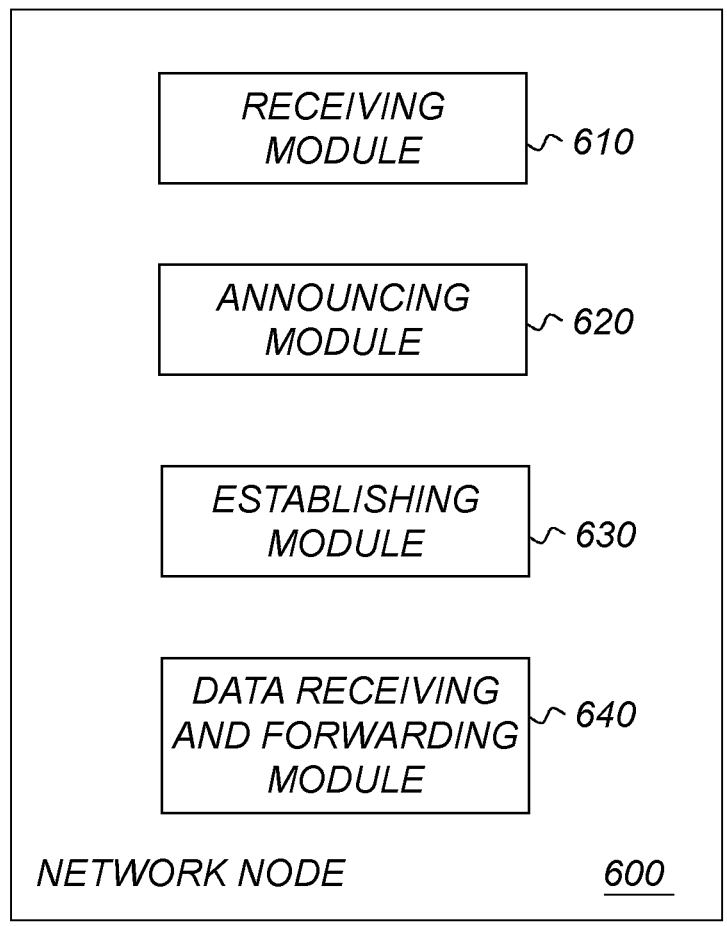
FIG. 22 is a schematic block diagram illustrating an example of another network node comprising a group of function modules.

FIG. 22 is a schematic block diagram illustrating an example of a network node comprising a group of function modules. The network node is denominated as a second network node for supporting carrier aggregation between different radio access networks, wherein the second network node is adapted for operation in a second radio access network. The second network node 600 comprises:
  a receiving module 610 for receiving configuration for establishing an association with a wireless device;
  an announcing module 620 for announcing a network identifier;
  an establishing module 630 for establishing the association with the wireless device if the wireless device connected to the second network node using the network identifier; and
  a data receiving and forwarding module 640 for receiving data from the wireless device and forwarding the data to a first network node of a first radio access network.

Figure 23:
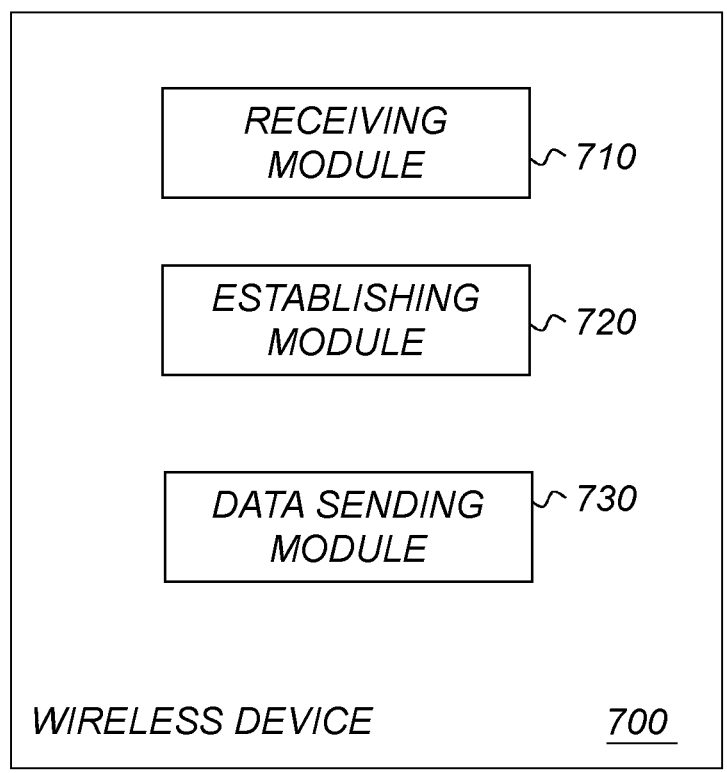
FIG. 23 is a schematic block diagram illustrating an example of a wireless device comprising a group of function modules

FIG. 23 is a schematic block diagram illustrating an example of a wireless device comprising a group of function modules. The wireless device is configured for supporting carrier aggregation between different radio access networks. The wireless device 700 comprises:
  a receiving module 710 for receiving information for establishing an association with a network node of a radio access network, said information comprising a network identifier;
  an establishing module 720 for establishing an association with the network node using the network identifier; and
  a data sending module 730 for sending, to the network node, data targeted for another network node of a different radio access network.

Alternatively it is possibly to realize the modules in FIGS. 21-23 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits, ASICs, as previously mentioned. Other examples of usable hardware include input/output, I/O, circuitry and/or circuitry for receiving and/or sending signals. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the scope of the proposed technology. In particular, different part solutions in the different embodiments can be combined in other configurations, where technically possible.

ABBREVIATIONS

3GPP 3rd Generation Partnership Project
AAA Authentication, Authorization and Accounting
AC Access Controller
AKA Authentication and Key Agreement
ANDSF Access Network Discovery and Selection Function
AP Access Point
AS Access Stratum
AuC Authentication Centre
AV Authentication Vector
BSSID Basic Service Set ID
DNS Domain Name System
DRB Data Radio Bearer
EAP Extensible Authentication Protocol
eNB eNodeB
ESS Extended Service Set
ESSID Extended Service Set ID
GTK Group Temporal Key
GUMMEI Globally Unique MME Identifier
GUTI Globally Unique Temporary UE Identity
HLR Home Location Register
HSS Home Subscriber Server
IMSI International Mobile Subscriber Identity
LLC Logical Link Control
LTE Long Term Evolution
MAC Media Access Control
MME Mobility Management Entity
NAS Non-Access Stratum
OPI Offloading Preference Indicator
PBNC Port-Based Network Control
PDCP Packet Data Convergence Protocol
PDP Packet Data Protocol
PMK Pairwise Master Key
PTK Pairwise Temporal Key
RBS Radio Base Station
RLC Radio Link Control
RRC Radio Resource Control
SMS Short Message Service
SRB Signalling Radio Bearer
SSID Service Set ID
STA Station S-TMSI S-Temporary Mobile Subscriber Identity
UE User Equipment
SIM Subscriber Identity Module
VoIP Voice over IP
WLAN Wireless Local Area Network
WPA2-PSK Wi-Fi Protected Access 2—Pre-Shared Key

The invention claimed is:

1. A method of operation of a first network node for supporting carrier aggregation between different radio access networks, the first network node configured for operation in a first radio access network, wherein the first radio access network is a cellular radio access network and the first network node is a base station, the method comprising:
configuring a second network node of a second radio access network with keying material; and
configuring the second network node to establish an association with a wireless device associated with a given identifier based on said keying material, wherein the establishment of the association is based on an exchange of random value(s) between the second network node and the wireless device, enabling generation of a key using said random value(s) and the keying material; and
configuring said second network node to forward data from the wireless device to said first network node.

2. The method of claim 1, wherein the method further comprises configuring the wireless device with information enabling the wireless device to derive said keying material.

3. The method of claim 1, wherein the method further comprises configuring the wireless device with a network identifier associated with the second network node, enabling the wireless device to establish the association with the configured second network node.

4. A first network node configured to support carrier aggregation between different radio access networks, the first network node adapted for operation in a first radio access network, wherein the first radio access network is a cellular radio access network and the first network node is a base station, the first network node comprises a processor and a memory, wherein the memory comprises instructions executable by the processor, whereby the processor is operative to:
configure a second network node of a second radio access network with keying material;
configure the second network node to establish an association with a wireless device associated with a given identifier based on said keying material, wherein the establishment of the association is based on an exchange of random value(s) between the second network node and the wireless device, enabling generation of a key using said random value(s) and the keying material; and
configure said second network node to forward data from the wireless device to said first network node.

5. A method of operation of a second network node for supporting carrier aggregation between different radio access networks, the second network node configured for operation in a second radio access network, the method comprising:
receiving configuration for establishing an association with a wireless device, wherein the establishment of the association is based on an exchange of random value(s) between the second network node and the wireless device, enabling generation of a key using said random value(s) and keying material;
announcing a network identifier;
establishing the association with the wireless device if the wireless device connected to the second network node using the network identifier; and
receiving data from the wireless device and forwarding the data to a first network node of a first radio access network wherein the first radio access network is a cellular radio access network and the first network node is a base station.

6. A method of operation of a wireless device for supporting carrier aggregation between different radio access networks, the method comprising:
receiving information for establishing an association with a second network node of a second radio access network, said information comprising a network identifier;
deriving a key based on at least the received information and using said key to establish the association with the second network node;
establishing the association with the second network node using the network identifier, wherein the establishment of the association is based on an exchange of random value(s) between the second network node and the wireless device, enabling generation of the key using said random value(s) and keying material; and
sending data, targeted for a first network node of a first radio access network, to the second network node, wherein the first radio access network is a cellular radio access network and the first network node is a base station.

7. The method of claim 6, wherein the information comprises the keying material.

8. The method of claim 6, wherein the key(s) enables encryption of over-the-air traffic.

9. The method of claim 6, wherein the first radio access network is the cellular radio access network and the second radio access network is a Wireless Local Area Network, WLAN, and the first network node is the base station and the second network node is an access point, and the wireless device is a User Equipment, UE, or wireless station, STA.

10. The method of claim 6, wherein the association is a security association between the wireless device and the second network node.

11. The method of claim 10, wherein aggregated UE data targeted for the first network node is encrypted based on the security association.

12. The method of claim 10, wherein the security association is a Wireless Local Area Network (WLAN) security association.

13. The method of claim 6, wherein the network identifier is a network node identifier and the keying material includes one or more security keys or information for deriving one or more security keys.

14. A wireless device configured to support carrier aggregation between different radio access networks, the wireless device comprises a processor and a memory, wherein the memory comprises instructions executable by the processor, whereby the processor is operative to:
receive information for establishing an association with a network node of a radio access network, said information comprising a network identifier;
derive a key based on at least the received information and using said key to establish the association with a second network node
establish the association with the network node using the network identifier, wherein the establishment of the association is based on an exchange of random value(s) between the second network node and the wireless device, enabling generation of the key using said random value(s) and keying material; and
send, to the network node, data targeted for another network node of a different radio access network wherein the different radio access network is a cellular radio access network and the another network node is a base station.

15. The wireless device of claim 14, further operative to receive the information comprising the keying material.

16. The wireless device of claim 14, further operative to derive the key based on at least the received information and using said key to establish the association with the network node.

* * * * *